(12) United States Patent
Jung et al.

(10) Patent No.: US 8,754,932 B2
(45) Date of Patent: Jun. 17, 2014

(54) METHOD AND APPARATUS FOR DISPLAYING 3-DIMENSIONAL IMAGE AND METHOD AND APPARATUS FOR CONTROLLING SHUTTER GLASSES

(75) Inventors: Jong-hoon Jung, Suwon-si (KR); Sang-moo Park, Yongin-si (KR); Dae-sik Kim, Hwaseong-si (KR); Dong-choon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 611 days.

(21) Appl. No.: 12/973,444

(22) Filed: Dec. 20, 2010

(65) Prior Publication Data
US 2011/0157165 A1 Jun. 30, 2011

(30) Foreign Application Priority Data
Dec. 30, 2009 (KR) ........................ 10-2009-0134919

(51) Int. Cl.
*G06T 15/00* (2011.01)
*H04N 13/04* (2006.01)

(52) U.S. Cl.
USPC ............. 348/56; 345/204; 345/205; 345/419; 345/422; 348/43; 348/53; 348/54; 348/55; 348/57; 348/58; 348/59

(58) Field of Classification Search
USPC ........ 345/419, 204, 205, 422; 348/55, 56, 43, 348/53, 54, 57, 58, 59
See application file for complete search history.

(56) References Cited

U.S. PATENT DOCUMENTS

| 6,215,590 | B1* | 4/2001 | Okano ........................... 359/464 |
| 2007/0200792 | A1* | 8/2007 | Kim et al. ......................... 345/7 |
| 2008/0284801 | A1 | 11/2008 | Brigham et al. |
| 2008/0297671 | A1 | 12/2008 | Cha et al. |
| 2008/0303963 | A1* | 12/2008 | Jung et al. ........................ 349/13 |
| 2008/0316596 | A1* | 12/2008 | Cha et al. ....................... 359/463 |
| 2009/0237495 | A1* | 9/2009 | Kawahara ........................ 348/56 |
| 2010/0066820 | A1* | 3/2010 | Park et al. ........................ 348/53 |

(Continued)

FOREIGN PATENT DOCUMENTS

| CN | 101029975 A | 9/2007 |
| JP | 2004-163447 A | 6/2004 |

(Continued)

OTHER PUBLICATIONS

Communication dated Sep. 16, 2011 from the International Searching Authority in counterpart application No. PCT/KR2010/009180.

(Continued)

*Primary Examiner* — Christopher S Kelley
*Assistant Examiner* — Zhihan Zhou
(74) *Attorney, Agent, or Firm* — Sughrue Mion, PLLC

(57) ABSTRACT

An image display method includes alternately receiving left and right images of a 3D image; and turning on a backlight such that the backlight is on only in periods when the left images are displayed or only in periods when the right images are displayed. A method of controlling shutter glasses separately for left and right images of a three-dimensional (3D) image includes alternately receiving the left and right images of the 3D image; and opening two shutters of the shutter glasses only in periods when the left images are received or only in periods when the right images are received.

14 Claims, 23 Drawing Sheets

(56) References Cited

U.S. PATENT DOCUMENTS

| | | | |
|---|---|---|---|
| 2010/0165079 A1* | 7/2010 | Yamada | 348/43 |
| 2010/0289883 A1* | 11/2010 | Goris et al. | 348/56 |
| 2011/0018983 A1* | 1/2011 | Kim et al. | 348/56 |
| 2011/0102422 A1* | 5/2011 | Park et al. | 345/419 |
| 2011/0122237 A1* | 5/2011 | Hong | 348/56 |
| 2012/0086774 A1* | 4/2012 | Nam | 348/43 |

FOREIGN PATENT DOCUMENTS

| | | | |
|---|---|---|---|
| JP | 2007-65067 A | 3/2007 | |
| JP | 2011-75959 A | 4/2011 | |
| JP | 2011-118302 A | 6/2011 | |
| KR | 1020080113694 A | 12/2008 | |
| WO | 2008/144110 A1 | 11/2008 | |
| WO | 2009/051603 A1 | 4/2009 | |
| WO | WO 2009069026 A2 * | 6/2009 | |
| WO | WO 2009069026 A2 | 6/2009 | |

OTHER PUBLICATIONS

Communication, dated Jul. 16, 2013, issued by the Mexican Patent Office in counterpart Mexican Application No. MX/a/2012/007538.
Communication from the European Patent Office issued May 14, 2013 in counterpart European Application No. 10841176.0.
Communication from the Mexican Patent Office dated Jan. 14, 2014, in a counterpart Mexican application No. MX/a/2012/007538.
Communication, dated Apr. 8, 2014, issued by the Japanese Patent Office in counterpart Japanese Patent Application No. 2012-546995.
Communication, dated Apr. 21, 2014, issued by the State Intellectual Property Office of P.R. China in counterpart Chinese Patent Application No. 201080060114.5.

* cited by examiner

METHOD AND APPARATUS FOR DISPLAYING 3-DIMENSIONAL IMAGE AND METHOD AND APPARATUS FOR CONTROLLING SHUTTER GLASSES

CROSS-REFERENCE TO RELATED PATENT APPLICATION

This application claims priority from Korean Patent Application No. 10-2009-134919, filed on Dec. 30, 2009, in the Korean Intellectual Property Office, the disclosure of which is incorporated herein in its entirety by reference.

BACKGROUND

1. Field

Methods and apparatuses consistent with exemplary embodiments relate to displaying a three-dimensional (3D) image and controlling shutter glasses, and more particularly, to displaying a 3D image and controlling shutter glasses, to enable a 3D image to be viewed like a 2D image.

2. Description of the Related Art 3D image display apparatuses capable of displaying 3D images are being developed. A 3D image is formed due to the stereoscopic vision of human eyes. Binocular parallax caused due to the separation of the eyes by about 65 mm is regarded as the most important factor in realizing a 3D effect. A 3D effect may be realized by separately showing a different-view image to each eye. For this, images are captured by using two identical cameras separated apart from each other by the distance between two eyes, and an image captured by a left camera is shown to only a left eye and an image captured by a right camera is shown to only a right eye.

3D image display apparatuses may use glasses or may utilize glasses-less methods. The glasses may be polarization glasses, shutter glasses, etc., and the glasses-less methods may include a parallax barrier method, a lenticular method, an integral imaging method, a holography method, etc.

From among the glasses, the shutter glasses may be liquid crystal shutter glasses used with a method that realizes a 3D image by using the glasses having liquid crystal shutters. In the liquid crystal shutter glasses method, different images are separately shown to left and right eyes in frequency periods of 60 Hz. A 3D image display apparatus using a liquid crystal shutter glasses method alternately displays left and right images at high speed and alternately opens or closes left and right liquid crystal shutters.

SUMMARY

Exemplary embodiments provide a method and apparatus for displaying a 3D image and a method and apparatus for controlling shutter glasses, enabling a 3D image to be viewed like a 2D image.

According to as aspect of an exemplary embodiment, there is provided a 3D image display method including alternately receiving left and right images of a 3D image; and turning on a backlight only in periods when the left images are displayed or only in periods when the right images are displayed.

A pair of corresponding left and right images of the 3D image may sequentially include a left image, a left image, a right image and a right image.

The turning on of the backlight may include turning on the backlight in periods when only one of the two left images or in periods when only one of the two right images is displayed.

A pair of corresponding left and right images of the 3D image may sequentially include a left image, a black image, a right image and a black image.

A pair of corresponding left and right images of the 3D image may sequentially include a left image, a hold image of the left image, a right image and a hold image of the right image, and the hold image may be an image which constantly maintains a data voltage of a previous left or right image.

The turning on of the backlight may include turning on the backlight only in periods when at least one of the left images and the hold image of the left image is displayed, or only in periods when at least one of the right images and the hold image of the right image is displayed.

A pair of corresponding left and right images of the 3D image may sequentially include a left image, a left image, a left image and a right image.

A pair of corresponding left and right images of the 3D image may sequentially include four continuous left images and four continuous right images.

The turning on of the backlight may include turning on the backlight in synchronization with a vertical synchronization (V-sync) signal.

The turning on of the backlight may include turning on the backlight in synchronization with a start vertical (STV) signal or a clock pulse vertical (CPV) signal.

The turning on of the backlight may include turning on the backlight by advancing or delaying periods when the backlight is turned on, according to an amount of crosstalk.

The turning on of the backlight may include turning on the backlight by using a scanning method.

According to an aspect of another exemplary embodiment, there is provided a method of controlling shutter glasses separately for left and right images of a 3D image, the method including alternately receiving the left and right images of the 3D image; and opening two shutters of the shutter glasses only in periods when the left images are received or only in periods when the right images are received.

A pair of corresponding left and right images of the 3D image may sequentially include a left image, a left image, a right image and a right image.

The opening of the two shutters of the shutter glasses may include opening the two shutters of the shutter glasses only in periods when one of the two left images are received or only in periods when one of the two right images is received.

The opening of the two shutters of the shutter glasses may include opening the two shutters of the shutter glasses only when at least one of the left image and the hold image of the left image is received, or only when at least one of the right image and the hold image of the right image is received.

The opening of the two shutters of the shutter glasses may include opening the two shutters of the shutter glasses in synchronization with a V-sync signal.

The opening of the two shutters of the shutter glasses may include opening the two shutters of the shutter glasses in synchronization with a STV signal or a CPV signal.

The opening of the two shutters of the shutter glasses may include opening the two shutters of the shutter glasses by changing periods when the backlight is turned on, according to an amount of crosstalk.

The opening of the two shutters of the shutter glasses may include opening the two shutters of the shutter glasses by using a scanning method.

According to another exemplary embodiment, there is provided a 3D image display apparatus including a display panel; a display panel control unit for outputting left and right images of a 3D image to the display panel; and a backlight control unit for turning on a backlight only in periods when the left images are displayed or only in periods when the right images are displayed.

According to an aspect of another exemplary embodiment, there is provided an apparatus for controlling shutter glasses separately for left and right images of a 3D image, the apparatus including a display panel; a display panel control unit for outputting the left and right images of the 3D image to the display panel; and a shutter glasses control unit for opening two shutters of the shutter glasses only in periods when the left images are displayed or only in periods when the right images are displayed.

According to an aspect of another exemplary embodiment, there is provided a two-dimensional image display method, the method comprising receiving a three-dimensional (3D) image comprising pairs of right and left images; displaying the 3D image on a display panel; controlling a backlight of the display panel such that: the backlight is on when right images are displayed and is off when left images are displayed, or the backlight is on when left images are displayed and is off when right images are displayed.

According to an aspect of another exemplary embodiment, there is provided a two-dimensional image display method, the method comprising receiving a three-dimensional (3D) image comprising pairs of right and left images; displaying the 3D image on a display panel; controlling shutters of user shutter glasses such that: the shutters are open only when right images are displayed and are closed when left images are displayed, or the shutters are open only when left images are displayed and are closed when right images are displayed.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the attached drawings.

Figure 1:
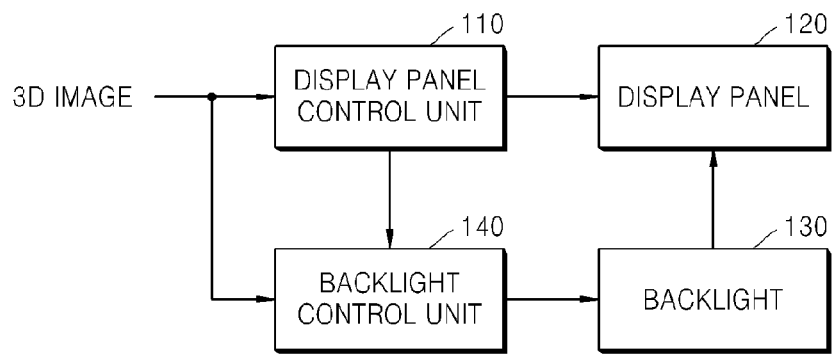
FIG. 1 is a block diagram of a 3D image display apparatus for controlling turn-on or turn-off of a backlight to view a 3D image like a 2D image, according to an exemplary embodiment.

FIG. 1 is a block diagram of a 3D image display apparatus for controlling turn-on or turn-off of a backlight 130 to view a 3D image like a 2D image, according to an exemplary embodiment. The 3D image display apparatus illustrated in FIG. 1 allows a viewer to view a 3D image like a 2D image when not wearing shutter glasses.

Referring to FIG. 1, the 3D image display apparatus includes a display panel control unit 110, a display panel 120, the backlight 130 and a backlight control unit 140.

The display panel control unit 110 alternately receives left and right images of a 3D image and outputs the left and right images to the display panel 120. The display panel 120 alternately outputs the left and right images according to a predetermined control signal received from the display panel control unit 110. The backlight 130 projects light onto the display panel 120. The backlight control unit 140 receives a predetermined synchronization signal from the display panel control unit 110 or from an external device. The backlight control unit 140 turns on or off the backlight 130 according to the predetermined synchronization signal. According to an exemplary embodiment, the backlight 130 is turned on in periods when only left images or only right images of a 3D image received from an external device are displayed. In this case, since the backlight 130 is turned on in periods when only left images or only right images are displayed, a viewer may view only the left images or only the right images. Accordingly, even when an image source is a 3D image, a viewer may view the 3D image like a 2D image.

Figure 2:
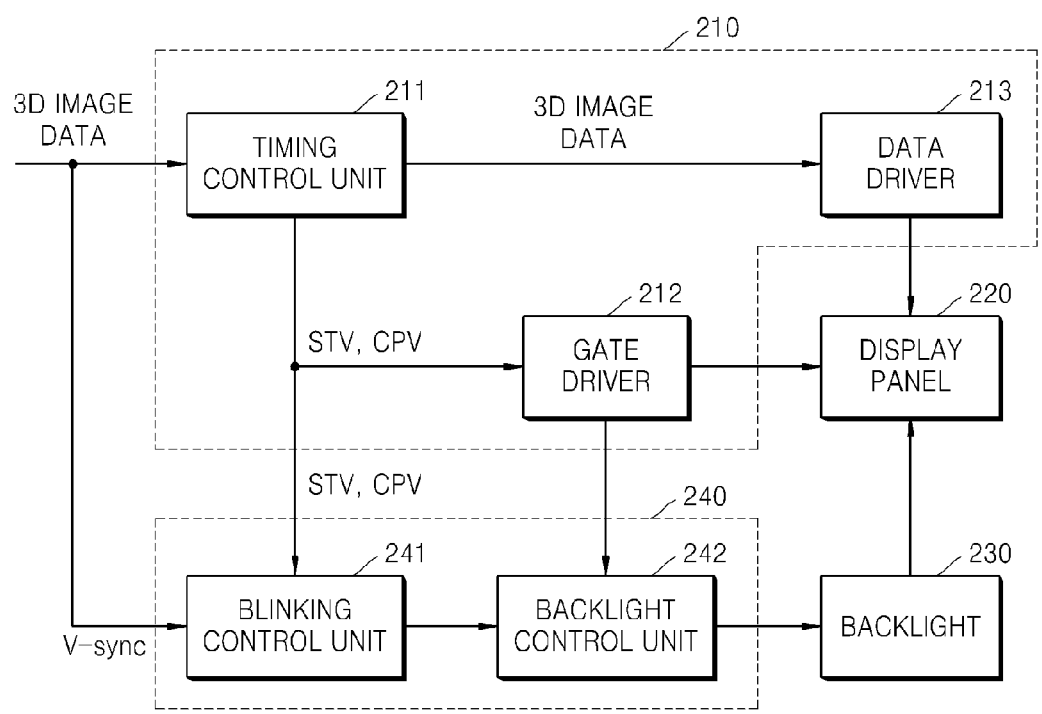
FIG. 2 is a detailed block diagram of the 3D image display apparatus illustrated in FIG. 1.

FIG. 2 is a detailed block diagram of the 3D image display apparatus illustrated in FIG. 1.

Referring to FIG. 2, the 3D image display apparatus includes a display panel control unit 210, a display panel 220, a backlight 230 and a backlight control unit 240. The display panel control unit 210 includes a timing control unit 211, a gate driver 212 and a data driver 213, and the backlight control unit 240 includes a blinking control unit 241 and a backlight driving unit 242.

The timing control unit 211 receives a 3D image signal from an external device. In general, a 3D image signal includes repeating pairs of corresponding left and right image signals. As left and right images are alternately output to the display panel 220, a 3D display may be realized. According to an exemplary embodiment, in a 3D image, one frame of a left image and one frame of a right image are alternately repeated. If a 3D image is output at 240 Hz, a pair of left and right images may be four-frame images. If a 3D image is output at 480 Hz, a pair of left and right images may be eight-frame images. Also, the timing control unit 211 generates a start vertical (STV) signal and a clock pulse vertical (CPV) signal as timing control data. The STV or CPV signals are used as synchronization signals to output a 3D image and to turn on the backlight 230.

The gate driver 212 sequentially provides a scan selection signal to a scan line in response to the STV or CPV signal received from the timing control unit 211 and selects a horizontal line to which a data voltage is provided.

The data driver 213 provides 3D image data received from the timing control unit 211, to a corresponding data line.

The display panel 220 includes a plurality of gate lines and a plurality of data lines, which are arranged in a matrix, and pixels separately disposed at intersections of the gate lines and the data lines, and displays an image on a region corresponding to a scan line and a data line respectively selected by the gate driver 212 and the data driver 213. Although liquid crystal display (LCD) panels are currently popular, the display panel 220 is not limited thereto and may be any display panel for displaying an image.

The blinking control unit 241 generates a backlight driving control signal in synchronization with the STV or CPV signal received from the timing control unit 211. According to another exemplary embodiment, a vertical synchronization (V-sync) signal may be received from an external device, and the backlight driving control signal may be generated in synchronization with the V-sync signal. The backlight 230 may also be driven by using a scanning method. The scanning method is a method of dividing the backlight 230 into a predetermined number of vertical blocks and turning on or off the backlight 230 according to scan timing from an upper block to a lower block. In this case, although not shown in FIG. 2, the blinking control unit 241 may be a scanning control unit. Timing diagrams representing when the blinking control unit 241 generates the backlight driving control signal according to a 3D image signal will be described in detail later with reference to FIGS. 3 through 11.

The backlight driving unit 242 outputs a backlight driving signal by using the backlight driving control signal received from the blinking control unit 241.

The backlight 230 projects light onto the display panel 220 according to the backlight driving signal received from the backlight driving unit 242. Although cold cathode fluorescent lamps (CCFLs) and light emitting diodes (LEDs) are currently popular, the backlight 230 is not limited thereto.

FIGS. 3 through 11 illustrate timing diagrams representing when a turn-on or a turn-off of a backlight is controlled to view a 3D image like a 2D image, according to exemplary embodiments. In particular, a timing diagram of an STV signal generated by the timing control unit 211 illustrated in FIG. 2, a timing diagram of a cycle of a 3D image signal received from an external device, and a timing diagram of a backlight turn-on cycle represented by a backlight driving control signal generated by the blinking control unit 241 illustrated in FIG. 2 are illustrated in each of FIGS. 3 through 11.

Figure 3:
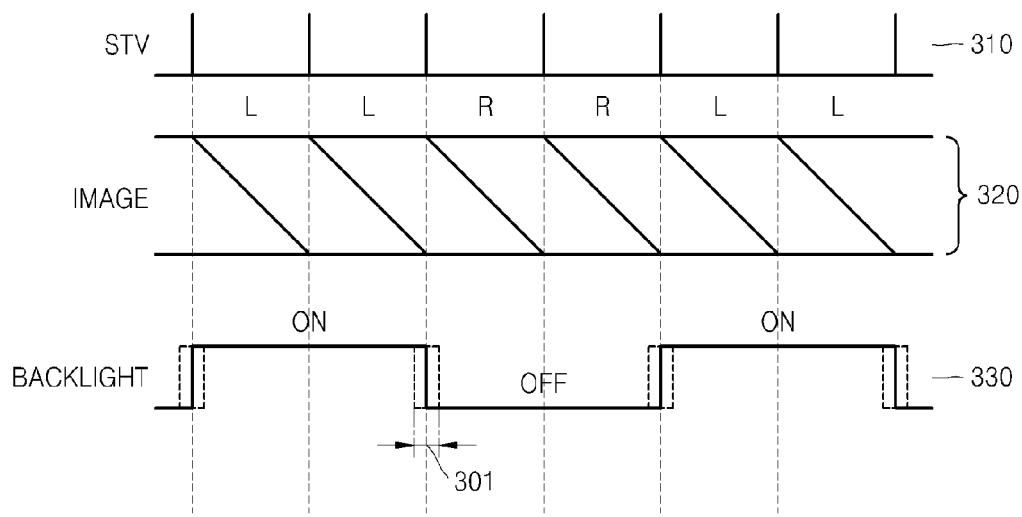
FIGS. 3 through 11 illustrate timing diagrams representing when turn-on or turn-off of a backlight is controlled to view a 3D image like a 2D image, according to exemplary embodiments.

FIG. 3 illustrates timing diagrams representing when a turn-on or a turn-off of a backlight is controlled to view a 3D image like a 2D image, according to an exemplary embodiment.

Referring to FIG. 3, a timing diagram 310 of an STV signal used as a synchronization signal, a timing diagram 320 of a 3D image signal output cycle in synchronization with the timing diagram 310 of the STV signal, and a timing diagram 330 of a backlight turn-on cycle are illustrated. In FIG. 3, a horizontal axis of each of the timing diagrams 310, 320 and 330 represents time and a vertical axis of the timing diagram 320 of the 3D image signal output cycle represents a vertical direction of a screen of a display panel.

Referring to the timing diagram 320 of the 3D image signal output cycle, one frame of a left image L or a right image R is displayed on a screen sequentially from top to bottom of the screen as time passes while the STV signal is input twice. In FIG. 3, a pair of corresponding left and right images of a 3D image sequentially includes four frames of a left image L, a left image L, a right image R and a right image R. That is, four frames of a left image L, a left image L, a right image R and a right image R are repeatedly output, in sequence, to a display panel. The two left images LL are identical left images and the two right images RR are identical right images.

Referring to the timing diagram 330 of the backlight turn-on cycle, according to the STV signal, the backlight is turned on in periods when only the left images LL are output and is turned off in periods when the right images RR are output. With respect to a pair of left and right images, the backlight is turned on in periods when only continuous two-frame left images LL are output and is turned off in periods when continuous two-frame right images RR are output. Since the backlight is turned on in periods when only left images are output, a viewer may view only the left images. Accordingly, even when an image source is a 3D image, a viewer may view the 3D image like a 2D image.

As indicated by reference numeral 301, in order to control the amount of crosstalk, a pulse width (or a frequency range) of a backlight turn-on signal may be changed in a + or − direction according to the speed of response in the display panel. Although not shown, the pulse width of the backlight turn-on signal may also be changed in the following timing diagrams.

Although not shown in FIG. 3, the above-described operation may be performed in the opposite way. That is, if the backlight is turned on in periods when only the right images RR are output and is turned off in periods when the left images LL are output, a viewer may view only right images and thus may view a 3D image like a 2D image.

Figure 4:
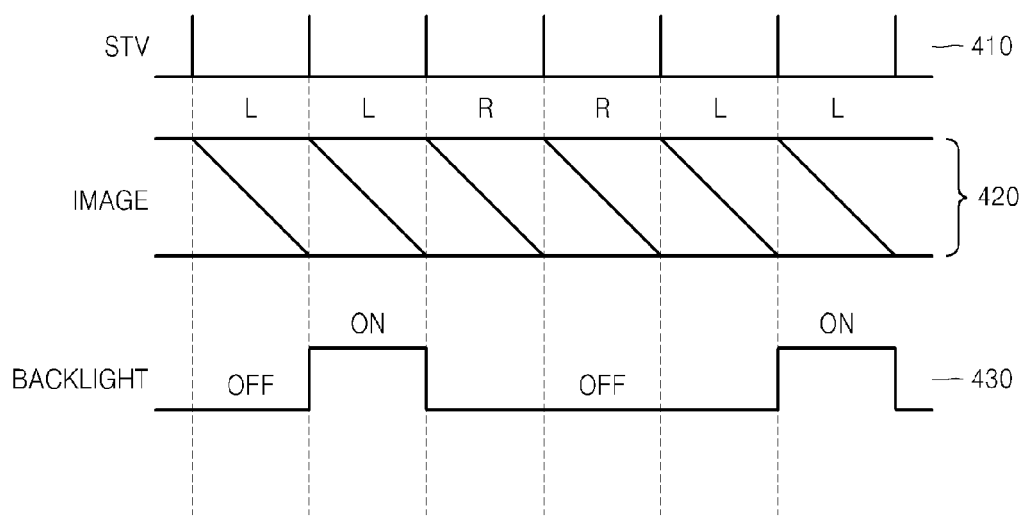

FIG. 4 illustrates timing diagrams representing when turn-on or turn-off of a backlight is controlled to view a 3D image like a 2D image, according to another embodiment of the present invention.

Referring to FIG. 4, a timing diagram 410 of an STV signal used as a synchronization signal, a timing diagram 420 of a 3D image signal output cycle in synchronization with the timing diagram 410 of the STV signal, and a timing diagram 430 of a backlight turn-on cycle are illustrated. The timing diagram 410 of the STV signal and the timing diagram 420 of the 3D image signal output cycle in FIG. 4 are respectively the same as the timing diagram 310 of the STV signal and the timing diagram 320 of the 3D image signal output cycle in FIG. 3, and thus detailed descriptions thereof will not be provided here.

Referring to the timing diagram 430 of the backlight turn-on cycle, according to the STV signal, the backlight is turned on in periods when only a temporally subsequent one of continuous two left images LL is output and is turned off in other periods. With respect to a pair of left and right images, the backlight is turned on in a period when only a temporally subsequent one of continuous two-frame left images LL is output and is turned off in periods when a temporally previous one of the continuous two-frame left images LL and two-frame right images RR are output. Since the backlight is turned on in periods when only left images are output, a viewer may view only the left images. Accordingly, even when an image source is a 3D image, a viewer may view the 3D image like a 2D image.

Although not shown in FIG. 4, the backlight may be turned on in periods when only a temporally previous one of the continuous two left images LL is output and may be turned off in other periods. In this case, a viewer may view only left images and thus may view a 3D image like a 2D image. Also, the backlight may be turned on in periods when only one of the continuous two right images RR is output and may be turned off in other periods. In this case, a viewer may view only right images and thus may view a 3D image like a 2D image.

Figure 5:
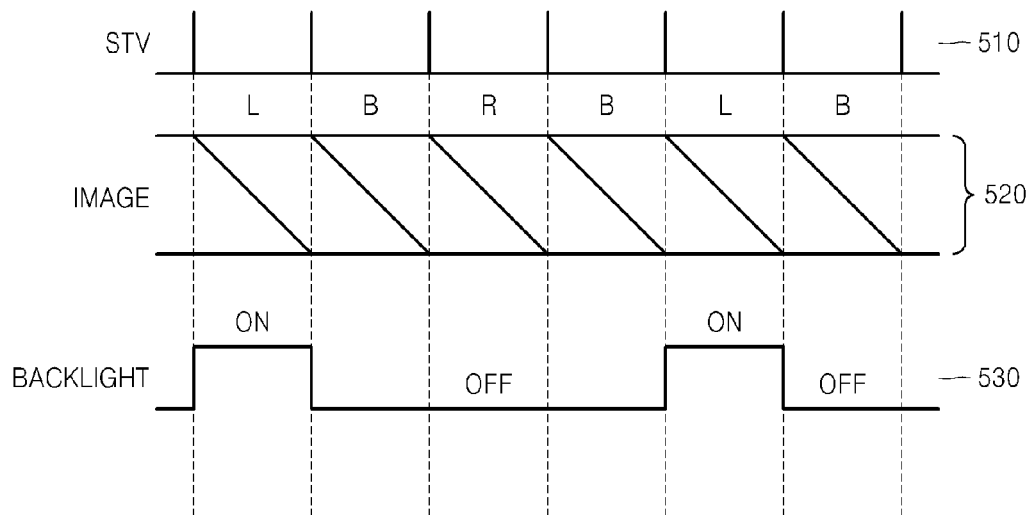

FIG. 5 illustrates timing diagrams representing when turn-on or turn-off of a backlight is controlled to view a 3D image like a 2D image, according to another exemplary embodiment.

Referring to FIG. 5, a timing diagram 510 of an STV signal used as a synchronization signal, a timing diagram 520 of a 3D image signal output cycle in synchronization with the timing diagram 510 of the STV signal, and a timing diagram 530 of a backlight turn-on cycle are illustrated. The timing diagram 510 of the STV signal in FIG. 5 is the same as the timing diagram 310 of the STV signal in FIG. 3, and thus a detailed description thereof will not be provided here.

In FIG. 5, a pair of corresponding left and right images of a 3D image sequentially includes four frames of a left image L, a black image B, a right image R and a black image B. That is, four frames, including one frame each of a left image L, a black image B, a right image R and a black image B, are repeatedly output, in sequence, to a display panel.

Referring to the timing diagram 530 of the backlight turn-on cycle, according to the STV signal, the backlight is turned on in periods when only the left image L is output and is turned off in other periods. With respect to a pair of left and right images, the backlight is turned on in only a period when a one-frame left image L is output and is turned off in periods during the two frames of black images BB and during the one frame of a right image R. Since the backlight is turned on only in periods when left images are output, a viewer may view only the left images. Accordingly, even when an image source is a 3D image, a viewer may view the 3D image like a 2D image.

Although not shown in FIG. 5, alternatively, the backlight may be turned on only in periods when the right image R is output and may be turned off in other periods (i.e., periods during the two frames of black images BB and the one frame of a left image L). In this case, a viewer may view only right images and thus may view a 3D image like a 2D image.

Figure 6A:
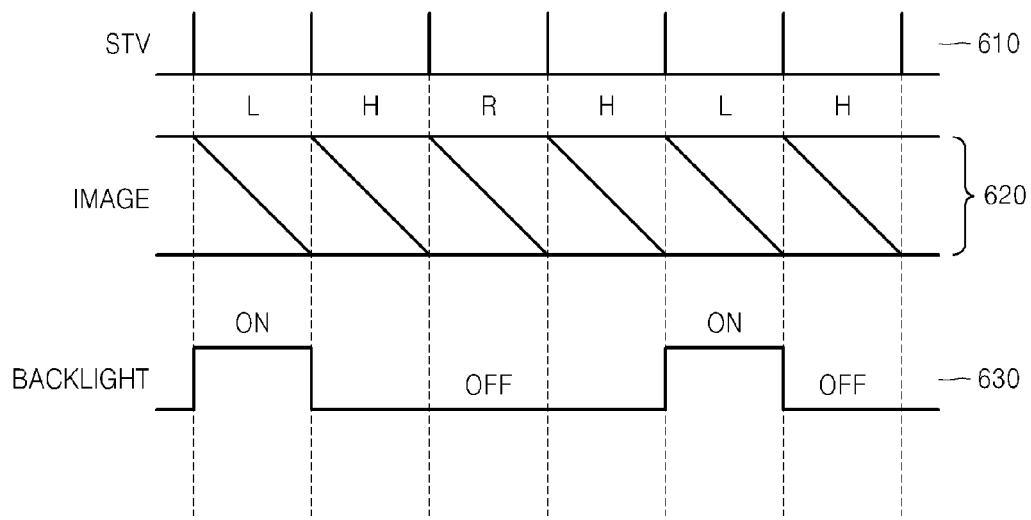
Figure 6B:
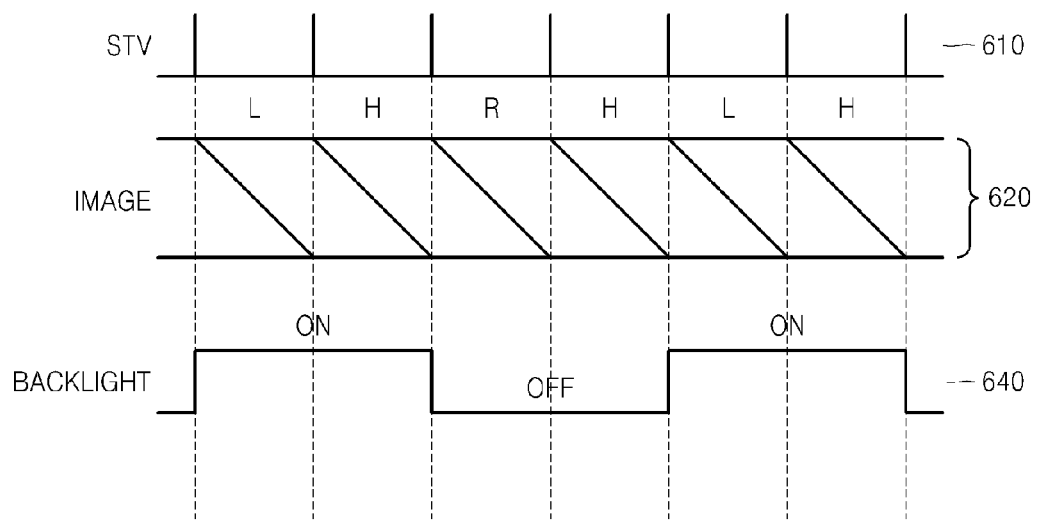
Figure 6C:
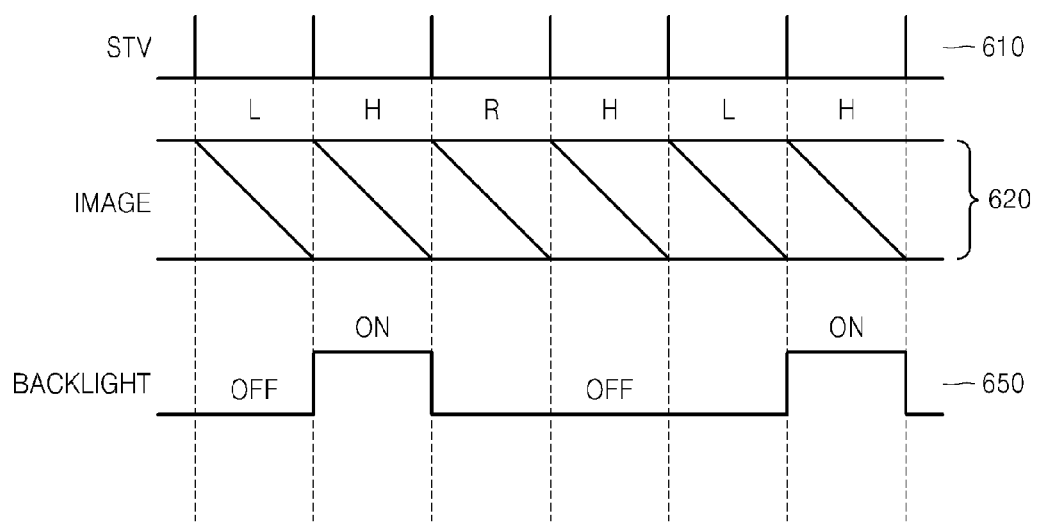

FIGS. 6A through 6C illustrate timing diagrams representing when a turn-on or a turn-off of a backlight is controlled to view a 3D image like a 2D image, according to another exemplary embodiment.

Referring to FIGS. 6A through 6C, a timing diagram 610 of an STV signal used as a synchronization signal, a timing diagram 620 of a 3D image signal output cycle in synchronization with the timing diagram 610 of the STV signal, and three timing diagrams 630, 640 and 650 of a backlight turn-on cycle are illustrated. The timing diagram 610 of the STV signal in FIGS. 6A through 6C is the same as the timing diagram 310 of the STV signal in FIG. 3, and thus a detailed description thereof will not be provided here.

In FIGS. 6A through 6C, a pair of corresponding left and right images of a 3D image sequentially include four frames, including one frame each of a left image L, a hold image H, a right image R, and a hold image H. That is, four frames, including one frame of a left image L, one frame of a hold image H, one frame of a right image R, and one frame of a hold image H, are repeatedly output, in sequence, to a display panel. The hold image H is an image for constantly maintaining a data voltage of a previous one-frame of a left or right image.

Referring to the timing diagram 630 of the backlight turn-on cycle in FIG. 6A, according to the STV signal, the backlight is turned on only in periods when the left image L is output and is turned off in other periods. With respect to a pair of left and right images, the backlight is turned on only in a period when one frame of a left image L is output and is turned off in periods corresponding to the two frames of hold images HH and the one frame of a right image R. Since the backlight is turned on only in periods when left images are output, a viewer may view only the left images. Accordingly, even when an image source is a 3D image, a viewer may view the 3D image like a 2D image.

Although not shown in FIG. 6A, alternatively, the backlight may be turned on only in periods when the right image R is output and may be turned off in other periods (i.e., periods corresponding to the two frames of hold images HH and the one frame of the left image). In this case, a viewer may view only right images and thus may view a 3D image like a 2D image.

Referring to the timing diagram 640 of the backlight turn-on cycle in FIG. 6B, according to the STV signal, the backlight is turned on only in periods when the left image L and the hold image H following the left image L are output and is turned off in other periods. With respect to a pair of left and right images, the backlight is turned on only in periods corresponding to the one frame of left image L and the one frame of hold image H following the left image L and is turned off in periods corresponding to the one frame of right image R and the one frame of hold image following the right image R. Since the backlight is turned on only in periods when left images and hold images following the left images are output, a viewer may view only the left images. Accordingly, even when an image source is a 3D image, a viewer may view the 3D image like a 2D image.

Although not shown in FIG. 6B, alternatively, the backlight may be turned on only in periods when the right image R and the hold image H following the right image R are output and may be turned off in other periods (i.e., periods when the left image L and the hold image H following the left image L are output). In this case, a viewer may view only right images and thus may view a 3D image like a 2D image.

Referring to the timing diagram 650 of the backlight turn-on cycle in FIG. 6C, according to the STV signal, the backlight is turned on only in periods when the hold image H following the left image L is output and is turned off in other periods. With respect to a pair of left and right images, the backlight is turned on only in a period when a one-frame hold image H following a one-frame left image L is output and is turned off in periods when the left image L, the right image R, and the one-frame hold image H following the right image R are output. Since the backlight is turned on only in periods when hold images following left images are output, a viewer may view only the left images. Accordingly, even when an image source is a 3D image, a viewer may view the 3D image like a 2D image.

Although not shown in FIG. 6C, alternately, the backlight may be turned on only in periods when the hold image H following the right image R is output and may be turned off in other periods (i.e., periods when the right image R, the left image L, and the hold image H following the left image L are output). In this case, a viewer may view only right images and thus may view a 3D image like a 2D image.

Figure 7:
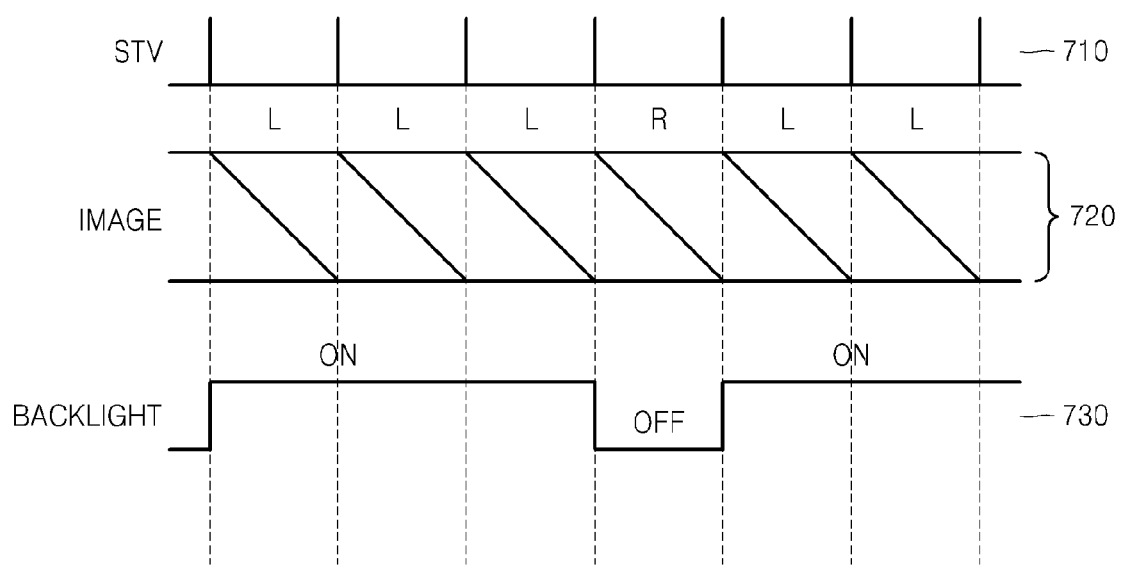

FIG. 7 illustrates timing diagrams representing when a turn-on or a turn-off of a backlight is controlled to view a 3D image like a 2D image, according to another exemplary embodiment.

Referring to FIG. 7, a timing diagram 710 of an STV signal used as a synchronization signal, a timing diagram 720 of a 3D image signal output cycle in synchronization with the timing diagram 710 of the STV signal, and a timing diagram 730 of a backlight turn-on cycle are illustrated. The timing diagram 710 of the STV signal in FIG. 7 is the same as the timing diagram 310 of the STV signal in FIG. 3, and thus a detailed description thereof will not be provided here.

In FIG. 7, a pair of corresponding left and right images of a 3D image is four frames, including three single frames of a left image L and one single frame of a right image R. That is, four frames including a left image L, a left image L, a left image L and a right image R are repeatedly output, in sequence, to a display panel.

Referring to the timing diagram 730 of the backlight turn-on cycle, according to the STV signal, the backlight is turned on only in periods when the left images LLL are output and is turned off in other periods. With respect to a pair of left and right images, the backlight is turned on only in periods corresponding to the three frames of left images LLL and is turned off in a period corresponding to the one frame of right image R. Since the backlight is turned on only in periods when left images are output, a viewer may view only the left images. Accordingly, even when an image source is a 3D image, a viewer may view the 3D image like a 2D image.

Although not shown in FIG. 7, alternately, the backlight may be turned on only in periods when one or two of the three frames of left images LLL are output and may be turned off in other periods. In this case, a viewer may view only left images and thus may view a 3D image like a 2D image. Also, the backlight may be turned on only in periods when the right image R is output and may be turned off in other periods. In this case, a viewer may view only right images and thus may view a 3D image like a 2D image.

Figure 8:
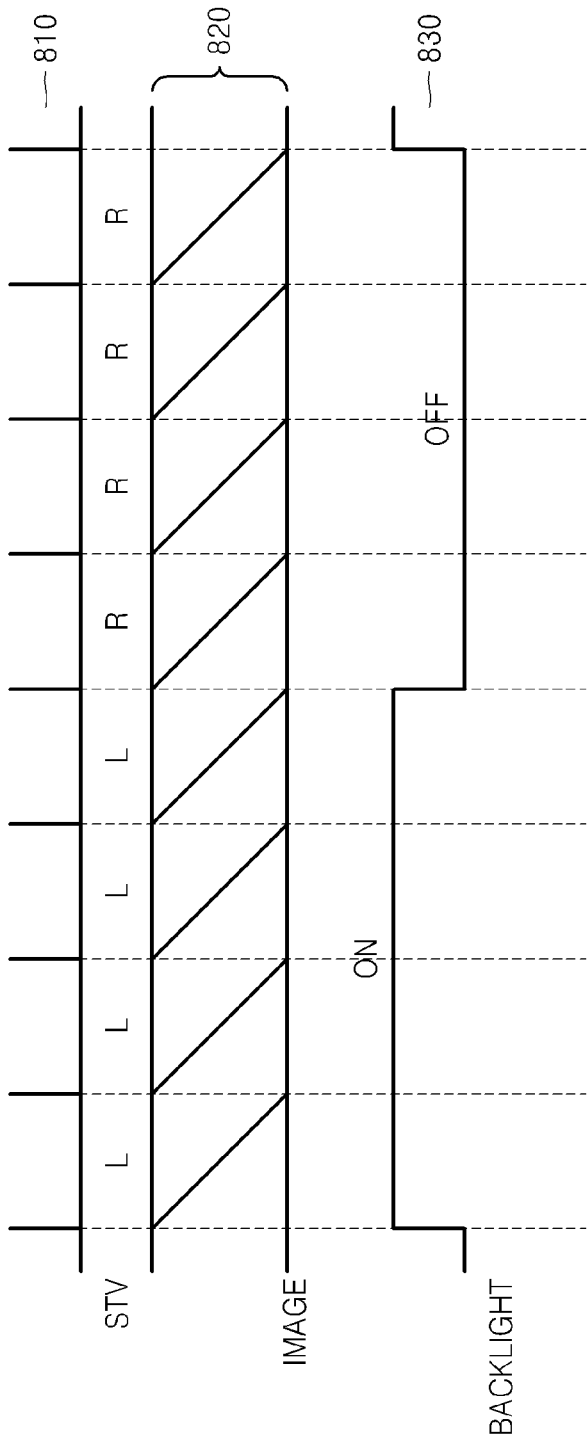

FIG. 8 illustrates timing diagrams representing when a turn-on or a turn-off of a backlight is controlled to view a 3D image like a 2D image, according to another exemplary embodiment.

Referring to FIG. 8, a timing diagram 810 of an STV signal used as a synchronization signal, a timing diagram 820 of a 3D image signal output cycle in synchronization with the timing diagram 810 of the STV signal, and a timing diagram 830 of a backlight turn-on cycle are illustrated. The timing diagram 810 of the STV signal in FIG. 8 is the same as the timing diagram 310 of the STV signal in FIG. 3, and thus a detailed description thereof will not be provided here.

In FIG. 8, a pair of corresponding left and right images of a 3D image is eight frames including four sequential frames of left images LLLL and four sequential frames of right images RRRR. That is, eight frames including a left image L, a left image L, a left image L, a left image L, a right image R, a right image R, a right image R and a right image R are repeatedly output, in sequence, to a display panel.

Referring to the timing diagram 830 of the backlight turn-on cycle, according to the STV signal, the backlight is turned on only in periods when the left images LLLL are output and is turned off in other periods. With respect to a pair of left and right images, the backlight is turned on in periods corresponding to the four frames of left images LLLL and is turned off in periods corresponding to the four frames of right images RRRR. Since the backlight is turned on only in periods when left images are output, a viewer may view only the left images. Accordingly, even when an image source is a 3D image, a viewer may view the 3D image like a 2D image.

Although not shown in FIG. 8, alternately, the backlight may be turned on only in periods when one, two or three of the four left images LLLL are output and may be turned off in other periods. In this case, a viewer may view only left images and thus may view a 3D image like a 2D image. Also, the backlight may be turned on only in periods when the right images RRRR, or one, two or three of the four right images RRRR are output and may be turned off in other periods. In this case, a viewer may view only right images and thus may view a 3D image like a 2D image.

Figure 9:
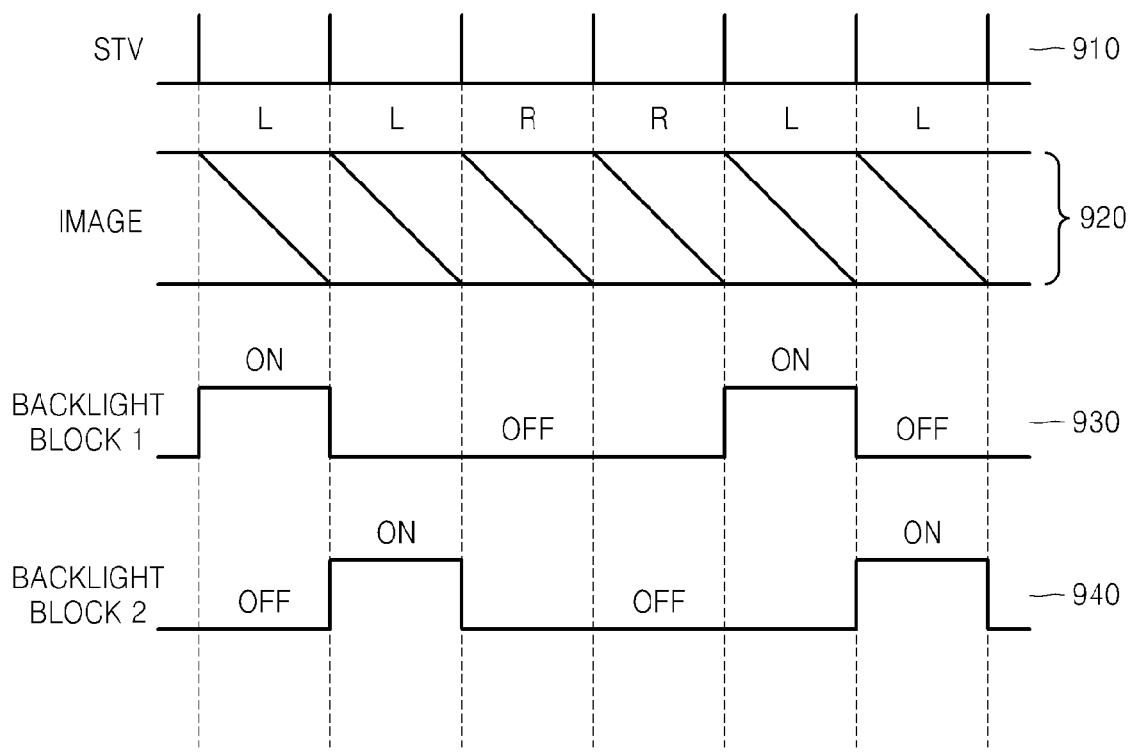

FIG. 9 illustrates timing diagrams representing when turn-on or turn-off of a backlight is controlled to view a 3D image like a 2D image, according to another exemplary embodiment.

Referring to FIG. 9, a timing diagram 910 of an STV signal used as a synchronization signal, a timing diagram 920 of a 3D image signal outputs cycle in synchronization with the timing diagram 910 of the STV signal, and timing diagrams 930 and 940 of a backlight turn-on cycle are illustrated. The timing diagram 910 of the STV signal and the timing diagram 920 of the 3D image signal output cycle in FIG. 9 are respectively the same as the timing diagram 310 of the STV signal and the timing diagram 320 of the 3D image signal output cycle in FIG. 3, and thus detailed descriptions thereof will not be provided here.

In FIG. 9, the backlight is divided into two blocks, i.e., blocks 1 and 2, and operates by using a scanning method. Two is an exemplary number of blocks and the number of blocks is not limited thereto. Referring to the timing diagram 930 of the backlight turn-on cycle in the block 1, according to the STV signal, the block 1 of the backlight is turned on only in periods when a first one of two continuous left images LL is output and is turned off in other periods. Referring to the timing diagram 940 of the backlight turn-on cycle in the block 2, the block 2 of the backlight is turned on after the block 1 of the backlight is turned off. In more detail, the block 2 of the backlight is turned on only in periods when a second one of two continuous left images LL is output and is turned off in other periods. That is, as in FIG. 3, the backlight is turned on only in periods when the two continuous left images LL are output. In this case, a viewer may view only left images and thus may view a 3D image like a 2D image.

Although not shown in FIG. 9, alternately, the block 1 of the backlight may be turned on when one of the two continuous left images LL starts to be output and may be turned off after a predetermined time passes, and the block 2 of the backlight may be turned on immediately after the block 1 of the backlight is turned off and may be turned off when one of the two continuous left images LL is completely output. Also, similarly, the blocks 1 and 2 of the backlight may be turned on only in periods when the right images RR are output instead of the left images LL.

Figure 10:
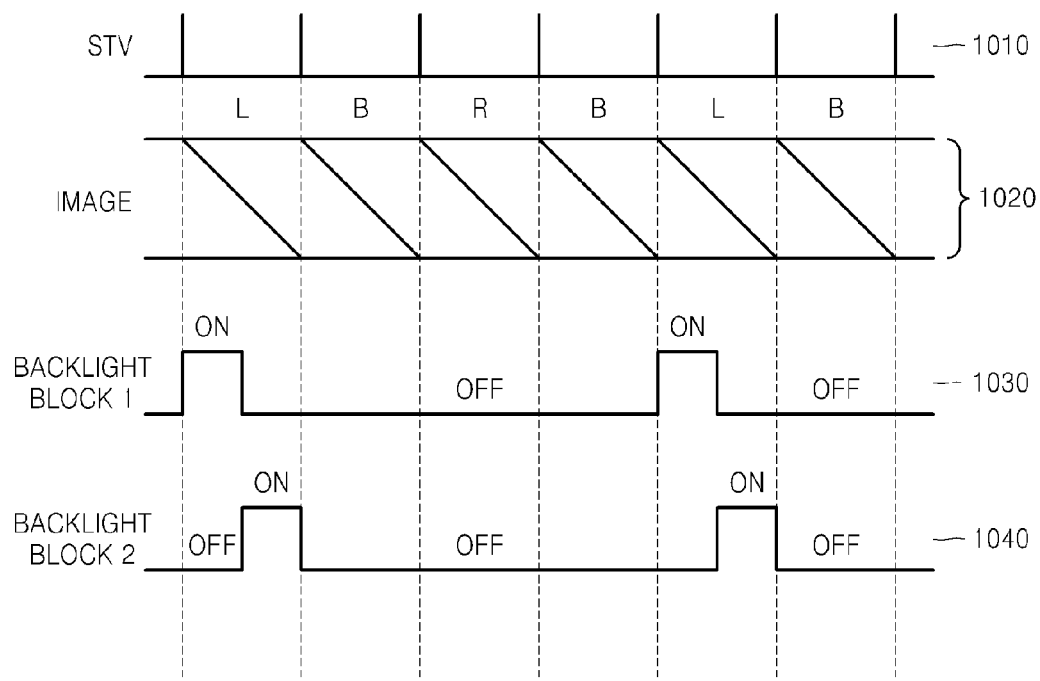

FIG. 10 illustrates timing diagrams representing when a turn-on or a turn-off of a backlight is controlled to view a 3D image like a 2D image, according to another exemplary embodiment.

Referring to FIG. 10, a timing diagram 1010 of an STV signal used as a synchronization signal, a timing diagram 1020 of a 3D image signal output cycle in synchronization with the timing diagram 1010 of the STV signal, and timing diagrams 1030 and 1040 of a backlight turn-on cycle are illustrated. The timing diagram 1010 of the STV signal and the timing diagram 1020 of the 3D image signal output cycle in FIG. 10 are respectively the same as the timing diagram 510 of the STV signal and the timing diagram 520 of the 3D image signal output cycle in FIG. 5, and thus detailed descriptions thereof will not be provided here.

In FIG. 10, the backlight is divided into two blocks, i.e., blocks 1 and 2, and operates by using a scanning method. Two is an exemplary number of blocks and the number of blocks is not limited thereto. Referring to the timing diagram 1030 of the backlight turn-on cycle in the block 1, according to the STV signal, the block 1 of the backlight is turned on when a left image L starts to be output and is turned off after a predetermined time passes. Referring to the timing diagram 1040 of the backlight turn-on cycle in the block 2, the block 2 of the backlight is turned on immediately after the block 1 of the backlight is turned off and is turned off when the left image L is completely output. That is, as in FIG. 5, the backlight is turned on only in periods when the left image L is output. In this case, a viewer may view only left images and thus may view a 3D image like a 2D image.

Although not shown in FIG. 10, alternately, the blocks 1 and 2 of the backlight may be turned on only in periods when the right image R is output instead of the left image L.

Figure 11:
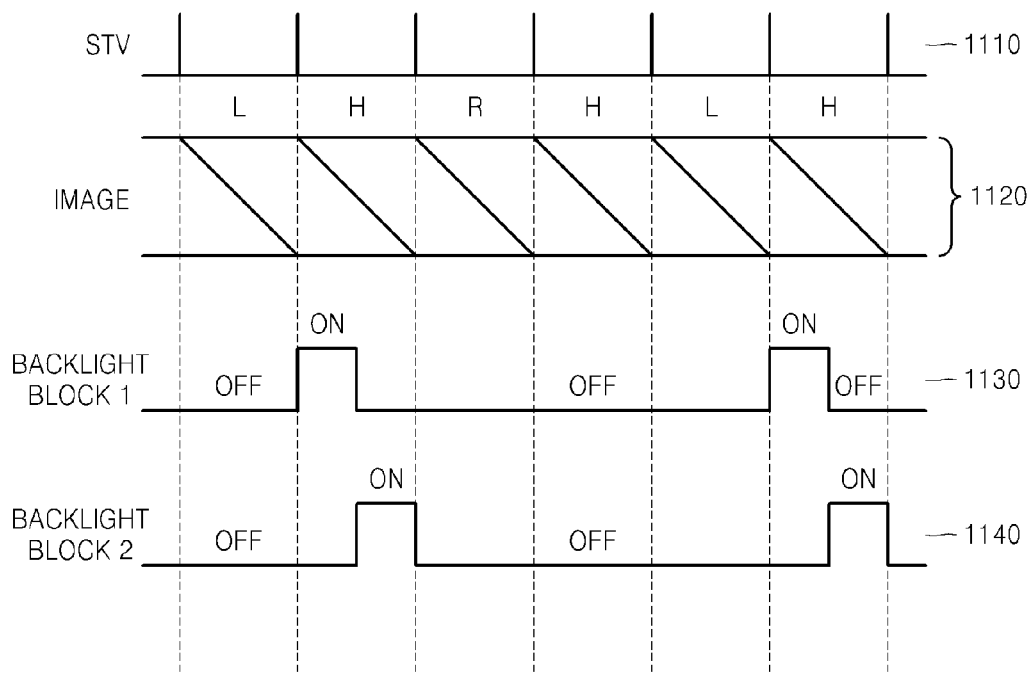

FIG. 11 illustrates timing diagrams representing when a turn-on or a turn-off of a backlight is controlled to view a 3D image like a 2D image, according to another exemplary embodiment.

Referring to FIG. 11, a timing diagram 1110 of an STV signal used as a synchronization signal, a timing diagram 1120 of a 3D image signal output cycle in synchronization with the timing diagram 1110 of the STV signal, and timing diagrams 1130 and 1140 of a backlight turn-on cycle are illustrated. The timing diagram 1110 of the STV signal and the timing diagram 1120 of the 3D image signal output cycle in FIG. 11 are respectively the same as the timing diagram 610 of the STV signal and the timing diagram 620 of the 3D image signal output cycle in FIGS. 6A through 6C, and thus detailed descriptions thereof will not be provided here.

In FIG. 11, the backlight is divided into two blocks, i.e., blocks 1 and 2, and operates by using a scanning method. Two is an exemplary number of blocks and the number of blocks is not limited thereto. Referring to the timing diagram 1130 of the backlight turn-on cycle in the block 1, according to the STV signal, the block 1 of the backlight is turned on when a hold image H following a left image L starts to be output and is turned off after a predetermined time passes. Referring to the timing diagram 1140 of the backlight turn-on cycle in the block 2, the block 2 of the backlight is turned on immediately after the block 1 of the backlight is turned off and is turned off when the hold image H following the left image L is completely output. That is, as in FIG. 6C, the backlight is turned on only in periods when the hold image H following the left image L is output. In this case, a viewer may view only left images and thus may view a 3D image like a 2D image.

Although not shown in FIG. 11, alternately, the blocks 1 and 2 of the backlight may be turned on only in periods when the left image L is output or the left image L and the hold image H following the left image L are output. Also, alternately, the blocks 1 and 2 of the backlight may be turned on only in periods when the right image R is output or the right image R and a hold image H following the right image R are output.

Figure 12:
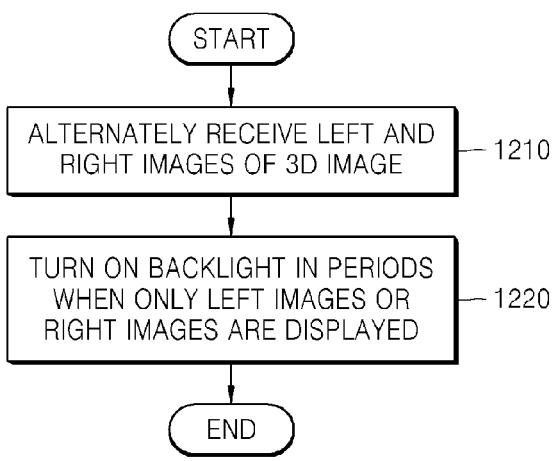
FIG. 12 is a flowchart of a method of controlling turn-on or turn-off of a backlight to view a 3D image like a 2D image, according to an exemplary embodiment.

FIG. 12 is a flowchart of a method of controlling a turn-on or a turn-off of a backlight to view a 3D image like a 2D image, according to an exemplary embodiment. The method illustrated in FIG. 12 allows a viewer to view a 3D image like a 2D image when not wearing shutter glasses.

Referring to FIG. 12, in operation 1210, left and right images of a 3D image are alternately received from an external device. According to an exemplary embodiment, a pair of left and right images sequentially includes a left image, an identical left image, a right image and an identical right image. According to an exemplary embodiment, a pair of left and right images sequentially includes a left image, a black image, a right image and a black image. According to an exemplary embodiment, a pair of left and right images sequentially includes a left image, a hold image, a right image and a hold image. In this case, the hold image is an image for constantly maintaining a data voltage of a previous-frame image. Accordingly, a hold image following a left image is an image for constantly maintaining a data voltage of the left image. According to an exemplary embodiment, a pair of left and right images sequentially includes a left image, an identical left image, an identical left image and a right image. According to an exemplary embodiment, a pair of left and right images may include eight frame images. In this case, a pair of left images may include four frames of identical left images and a pair of right images may include four frames of identical right images.

In operation 1220, the backlight is turned on only in periods when left images or right images are displayed. In this case, since only the left images or only the right images are output to a display panel, a viewer may view a 3D image like a 2D image. For example, in order to visually output only the left images, the backlight is turned on only in periods when the left images are output and is turned off in periods when the right image are output.

According to an exemplary embodiment, if a pair of left and right images sequentially includes a left image, an identical left image, a right image and an identical right image, the backlight may be turned on only in periods when the left images are output. For example, the backlight may be turned on only in periods when one or two of the two left images are output. The same method may also be applied to the right images.

According to an exemplary embodiment, if a pair of left and right images sequentially includes a left image, a black image, a right image and a black image, the backlight may be turned on only in periods when the left image or the right image is output and may be turned off in other periods.

According to an exemplary embodiment, if a pair of left and right images sequentially includes a left image, a hold image, a right image and a hold image, the backlight may be turned on only in periods when the left image and the hold image following the left image are output, or when the left image or the hold image following the left image is output, and may be turned off in other periods. The same method may also be applied to the right image and the hold image following the right image.

According to an exemplary embodiment, if a pair of left and right images sequentially includes a left image, an identical left image, an identical left image and a right image, the backlight may be turned on only in periods when at least one of the left images is output and may be turned off in other periods. The same method may also be applied to the right image.

According to an exemplary embodiment, if a pair of left and right images sequentially includes four frames of identical left images and four frames of identical right images, the backlight may be turned on only in periods when at least one of the left images is output and may be turned off in other periods. The same method may also be applied to the right images. In the above descriptions, the backlight may also be turned on or off by using a scanning method.

Figure 13:
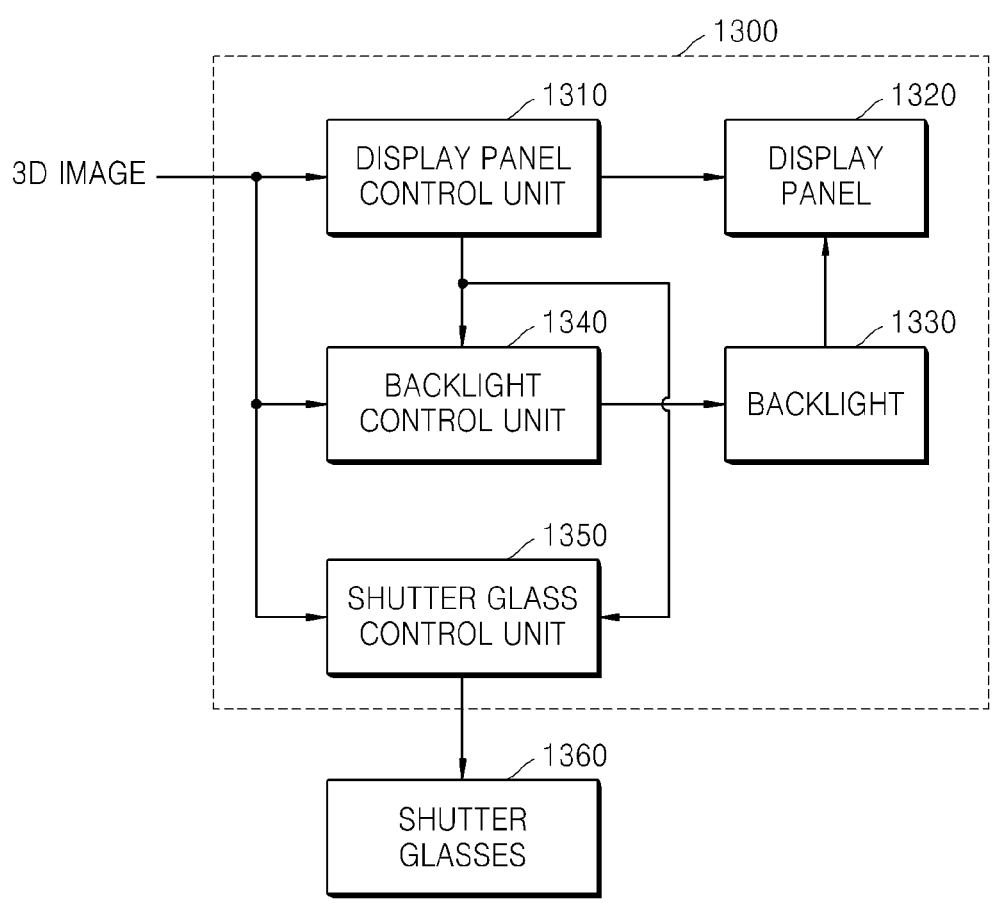
FIG. 13 is a block diagram of a 3D image display apparatus for controlling opening or closing of shutter glasses to view a 3D image like a 2D image, according to an exemplary embodiment.

FIG. 13 is a block diagram of a 3D image display apparatus 1300 for controlling opening or closing of left and right shutters of shutter glasses 1360 to view a 3D image like a 2D image, according to an exemplary embodiment.

Referring to FIG. 13, the 3D image display apparatus 1300 includes a display panel control unit 1310, a display panel 1320, a backlight 1330, a backlight control unit 1340 and a shutter glasses control unit 1350. The 3D image display apparatus 1300 illustrated in FIG. 13 allows a viewer to view a 3D image like a 2D image while wearing the shutter glasses 1360.

The display panel control unit 1310, the display panel 1320 and the backlight 1330 are the same as the display panel control unit 110, the display panel 120 and the backlight 130 illustrated in FIG. 1, and thus detailed descriptions thereof will not be provided here.

The backlight control unit 1340 turns on the backlight 1330 according to a predetermined synchronization signal received from the display panel control unit 1310 or an external device. According to an exemplary embodiment, the backlight control unit 1340 turns on the backlight 1330 from a start point of a 3D image signal received from an external device and continuously turns on the backlight 1330 until an end point of the 3D image signal.

The shutter glasses control unit 1350 controls opening or closing of the shutter glasses 1360 according to a predetermined synchronization signal received from the display panel control unit 1310 or an external device. Both the left and right shutters of the shutter glasses 1360 are opened in periods when only left images or right images of the 3D image signal are output. In this case, a viewer may view the left images or the right images and thus may view a 3D image like a 2D image.

Figure 14:
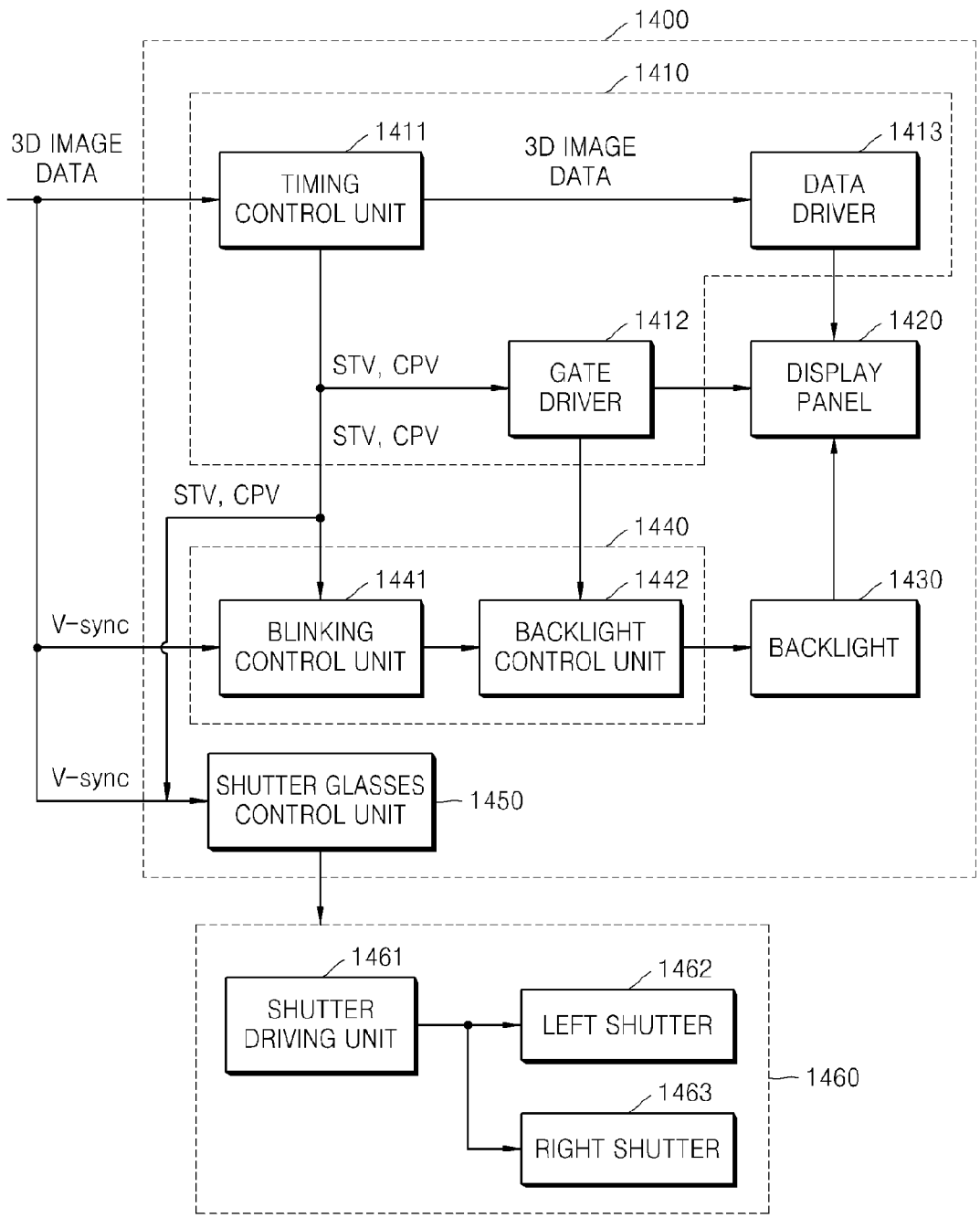
FIG. 14 is a detailed block diagram of the 3D image display apparatus illustrated in FIG. 13.

FIG. 14 is a detailed block diagram of the 3D image display apparatus 1400 illustrated in FIG. 13.

Referring to FIG. 14, the 3D image display apparatus 1400 includes a display panel control unit 1410, a display panel 1420, a backlight 1430, a backlight control unit 1440 and a shutter glasses control unit 1450. The display panel control unit 1410 includes a timing control unit 1411, a gate driver 1412 and a data driver 1413, the backlight control unit 1440 includes a blinking control unit 1441 and a backlight driving unit 1442, and shutter glasses 1460 include a shutter driving unit 1461, a left shutter 1462 and a right shutter 1463.

The timing control unit 1411, the timing control unit 1411, the gate driver 1412, the data driver 1413, the display panel 1420, the backlight 1430 and the backlight driving unit 1442 are the same as the timing control unit 211, the timing control unit 211, the gate driver 212, the data driver 213, the display panel 220, the backlight 230 and the backlight driving unit 242 illustrated in FIG. 2, and thus detailed descriptions thereof will not be provided here.

The blinking control unit 1441 outputs to the backlight driving unit 1442 a backlight driving control signal for turning on the backlight 1430 from a start point of a 3D image signal received from an external device and for continuously turning on the backlight 1430 until an end point of the 3D image signal. The backlight 1430 may also be driven by using a scanning method. In this case, although not shown in FIG. 14, the blinking control unit 1441 may be a scanning control unit.

Timing diagrams representing when the shutter glasses control unit 1450 generates a shutter glasses control signal for controlling opening or closing of the shutter glasses 1460 according to an STV or CPV signal received from the timing control unit 1411 or a V-sync signal received from an external device will be described in detail later with reference to FIGS. 15 through 23.

The shutter driving unit 1461 of the shutter glasses 1460 receives the shutter glasses control signal from the shutter glasses control unit 1450 of the 3D image display apparatus 1400 by wire or wirelessly, and provides a shutter driving signal to the left and right shutters 1462 and 1463 according to the shutter glasses control signal. The shutter driving signal may be provided in every line period of the left and right shutters 1462 and 1463. The left and right shutters 1462 and 1463 are open or closed according to the shutter driving signal provided from the shutter driving unit 1461.

FIGS. 15 through 23 illustrate timing diagrams representing when opening or closing of shutter glasses is controlled to view a 3D image like a 2D image, according to exemplary embodiments. In particular, a timing diagram of an STV signal generated by the timing control unit 1411 illustrated in FIG. 14, a timing diagram of a cycle of a 3D image signal received from an external device, a timing diagram of a backlight driving control signal generated by the blinking control unit 1441 illustrated in FIG. 14, and timing diagrams of opening or closing cycles of the left and right shutters 1462 and 1463 of the shutter glasses 1460 illustrated in FIG. 14, which are represented by a shutter glasses control signal generated by the shutter glasses control unit 1450 illustrated in FIG. 14, are illustrated in each of FIGS. 15 through 23.

Figure 15:
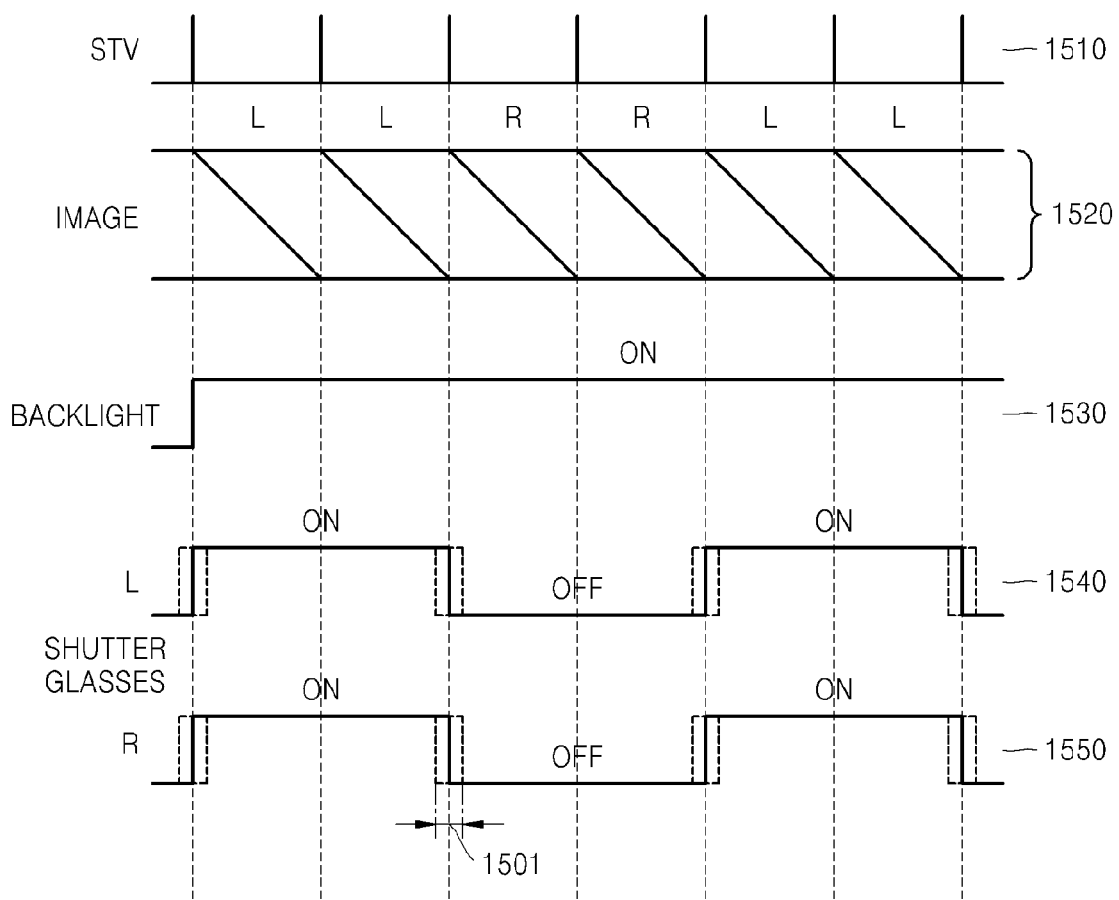
FIGS. 15 through 23 illustrate timing diagrams representing when opening or closing of shutter glasses is controlled to view a 3D image like a 2D image, according to exemplary embodiments.

FIG. 15 illustrates timing diagrams representing when opening or closing of shutter glasses is controlled to view a 3D image like a 2D image, according to an exemplary embodiment.

Referring to FIG. 15, a timing diagram 1510 of an STV signal used as a synchronization signal, a timing diagram 1520 of a 3D image signal output cycle in synchronization with the timing diagram 1510 of the STV signal, a timing diagram 1530 of a backlight turn-on cycle, and timing diagrams 1540 and 1550 of opening or closing cycles of left and right shutters of the shutter glasses are illustrated. In FIG. 15, a horizontal axis of each of the timing diagrams 1510, 1520, 1530, 1540 and 1550 represents time and a vertical axis of the timing diagram 1520 of the 3D image signal output cycle represents a vertical direction of a screen of a display panel.

Referring to the timing diagram 1520 of the 3D image signal output cycle, one frame of a left image L or a right image R is displayed on a screen sequentially from top to bottom of the screen as time passes while the STV signal is input twice. In FIG. 15, a pair of corresponding left and right images of a 3D image sequentially includes four frames including a left image L, a left image L, a right image R and a right image R. That is, one frame each of a left image L, a left image L, a right image R and a right image R are repeatedly output, in sequence, to a display panel. The two left images LL are identical left images and the two right images RR are identical right images.

Referring to the timing diagram 1530 of the backlight turn-on cycle, the backlight is turned on when a 3D image starts to be output and is continuously turned on while the 3D image is output.

Referring to the timing diagrams 1540 and 1550 of the opening or closing cycles of the left and right shutters of the shutter glasses, according to the STV signal, the left and right shutters are open in periods when only the left images LL are output and are closed in periods when the right images RR are output. With respect to a pair of left and right images, the left and right shutters are open only in periods when two continuous frames of left images LL are output and are closed in periods when two continuous frames of right images RR are output. Since the left and right shutters are only open in periods when left images are output, a viewer may view only the left images. Accordingly, even when an image source is a 3D image, a viewer may view the 3D image like a 2D image.

As indicated by reference numeral 1501, in order to control the amount of crosstalk, a pulse width (or a frequency range) of a left and right shutter opening or closing signal may be changed in a + or − direction according to the speed of response in the display panel. Although not shown, the pulse width of the left and right shutter opening or closing signal may also be changed in the following timing diagrams.

Although not shown in FIG. 15, the above-described operation may be performed in the opposite way. That is, if the left and right shutters are open only in periods when the right images RR are output and are closed in periods when the left images LL are output, a viewer may view only right images and thus may view a 3D image like a 2D image.

Figure 16:
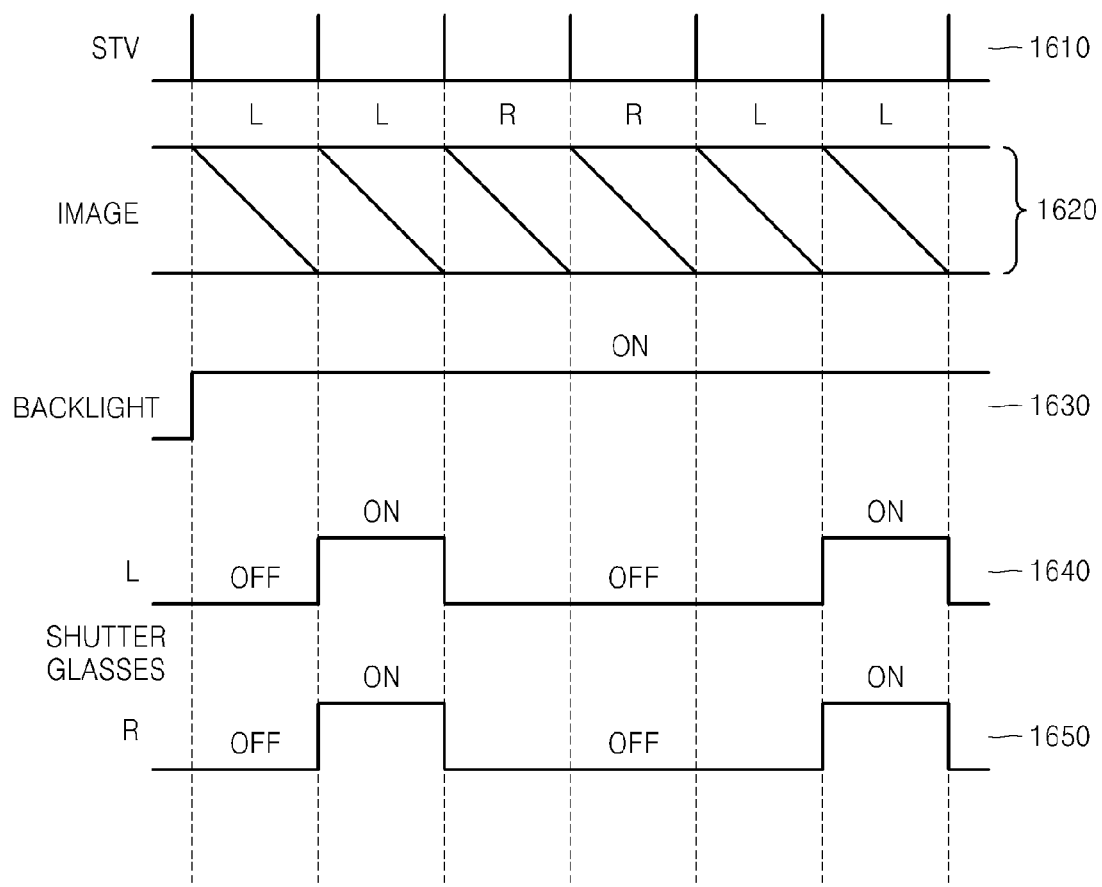

FIG. 16 illustrates timing diagrams representing when opening or closing of shutter glasses is controlled to view a 3D image like a 2D image, according to another exemplary embodiment.

Referring to FIG. 16, a timing diagram 1610 of an STV signal used as a synchronization signal, a timing diagram

1620 of a 3D image signal output cycle in synchronization with the timing diagram 1610 of the STV signal, a timing diagram 1630 of a backlight turn-on cycle, and timing diagrams 1640 and 1650 of opening or closing cycles of left and right shutters of the shutter glasses are illustrated. The timing diagram 1610 of the STV signal, the timing diagram 1620 of the 3D image signal output cycle, and the timing diagram 1630 of the backlight turn-on cycle in FIG. 16 are respectively the same as the timing diagram 1510 of the STV signal, the timing diagram 1520 of the 3D image signal output cycle, and the timing diagram 1530 of a backlight turn-on cycle in FIG. 15, and thus detailed descriptions thereof will not be provided here.

Referring to the timing diagrams 1640 and 1650 of the opening or closing cycles of the left and right shutters of the shutter glasses, according to the STV signal, the left and right shutters are open only in periods when a second one of two continuous left images LL is output and are closed in other periods. With respect to a pair of left and right images, the left and right shutters are open only in a period when a second one of two continuous frames of left images LL is output and are closed in periods when a first one of the two continuous frames of left images LL and when the two frames of right images RR are output. Since the left and right shutters are open only in periods when left images are output, a viewer may view only the left images. Accordingly, even when an image source is a 3D image, a viewer may view the 3D image like a 2D image.

Although not shown in FIG. 16, alternately, the left and right shutters may be open only in periods when a first one of the two continuous left images LL is output and may be closed in other periods. In this case, a viewer may view only left images and thus may view a 3D image like a 2D image. Also, alternatively, the left and right shutters may be open only in periods when one of the two continuous right images RR is output and may be closed in other periods. In this case, a viewer may view only right images and thus may view a 3D image like a 2D image.

Figure 17:
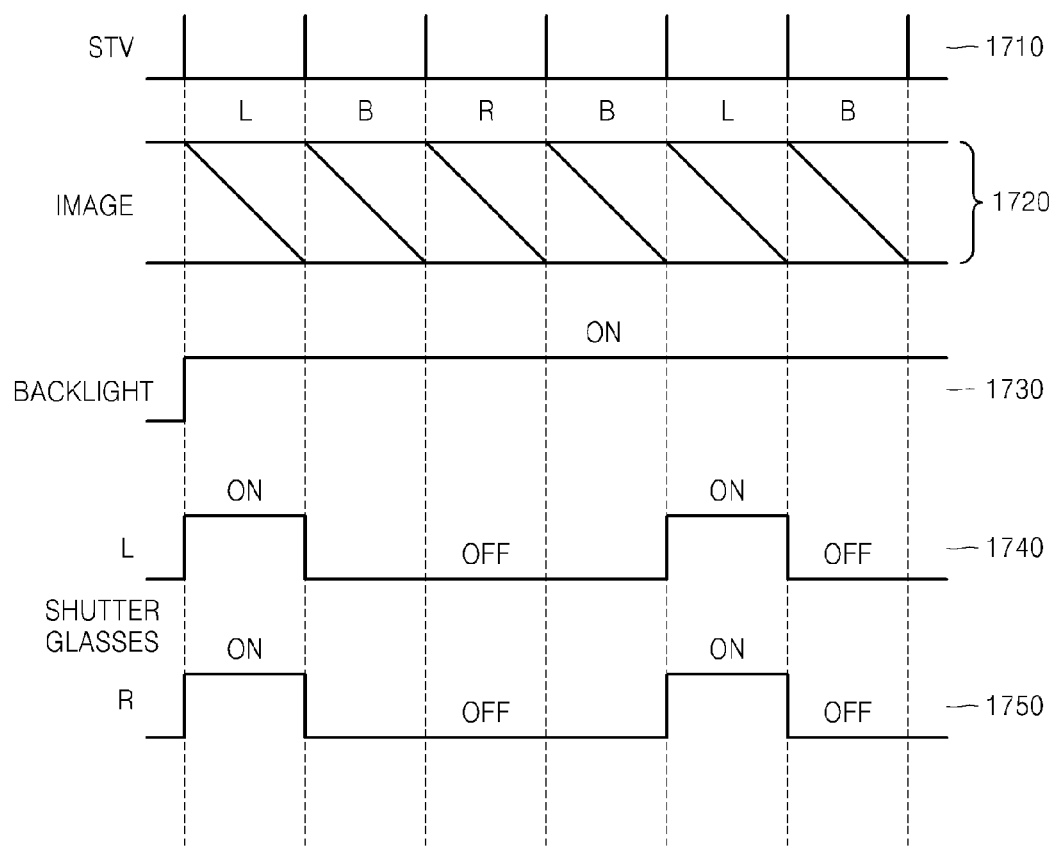

FIG. 17 illustrates timing diagrams representing when opening or closing of shutter glasses is controlled to view a 3D image like a 2D image, according to another exemplary embodiment.

Referring to FIG. 17, a timing diagram 1710 of an STV signal used as a synchronization signal, a timing diagram 1720 of a 3D image signal output cycle in synchronization with the timing diagram 1710 of the STV signal, a timing diagram 1730 of a backlight turn-on cycle, and timing diagrams 1740 and 1750 of opening or closing cycles of left and right shutters of the shutter glasses are illustrated. The timing diagram 1710 of the STV signal and the timing diagram 1730 of the backlight turn-on cycle in FIG. 17 are respectively the same as the timing diagram 1510 of the STV signal and the timing diagram 1530 of the backlight turn-on cycle in FIG. 15, and thus detailed descriptions thereof will not be provided here.

In FIG. 17, a pair of corresponding left and right images of a 3D image sequentially includes four frames including a single frame each of a left image L, a black image B, a right image R and a black image B. That is, the four frames including a left image L, a black image B, a right image R and a black image B are repeatedly output, in sequence, to a display panel.

Referring to the timing diagrams 1740 and 1750 of the opening or closing cycles of the left and right shutters of the shutter glasses, according to the STV signal, the left and right shutters are open only in periods when the left image L is output and are closed in other periods. With respect to a pair of left and right images, the left and right shutters are open only in a period when the one frame of the left image L is output and are closed in periods when the two frames of black images BB and the one frame of a right image R are output. Since the left and right shutters are open only in periods when left images are output, a viewer may view only the left images. Accordingly, even when an image source is a 3D image, a viewer may view the 3D image like a 2D image.

Although not shown in FIG. 17, alternately, the left and right shutters may be open only in periods when the right image R is output and may be closed in other periods (i.e., periods when the two black images BB and the left image L are output). In this case, a viewer may view only right images and thus may view a 3D image like a 2D image.

Figure 18A:
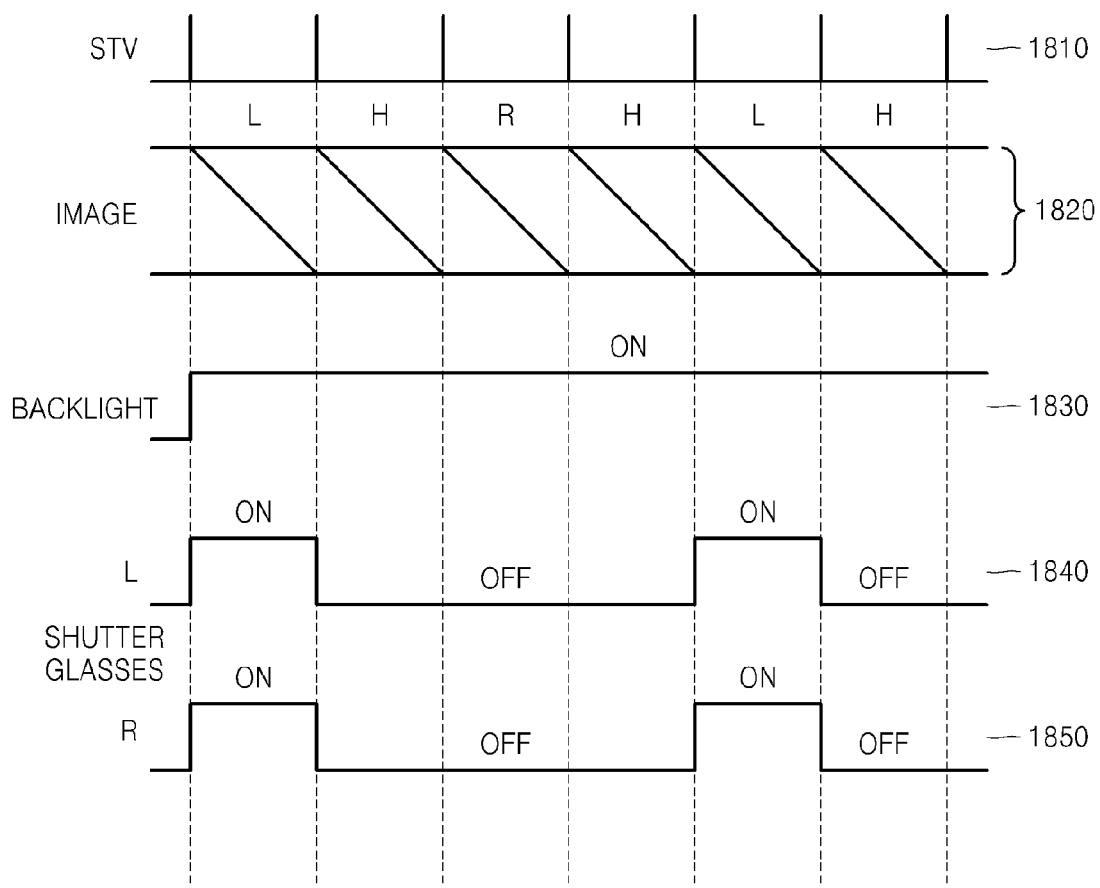
Figure 18B:
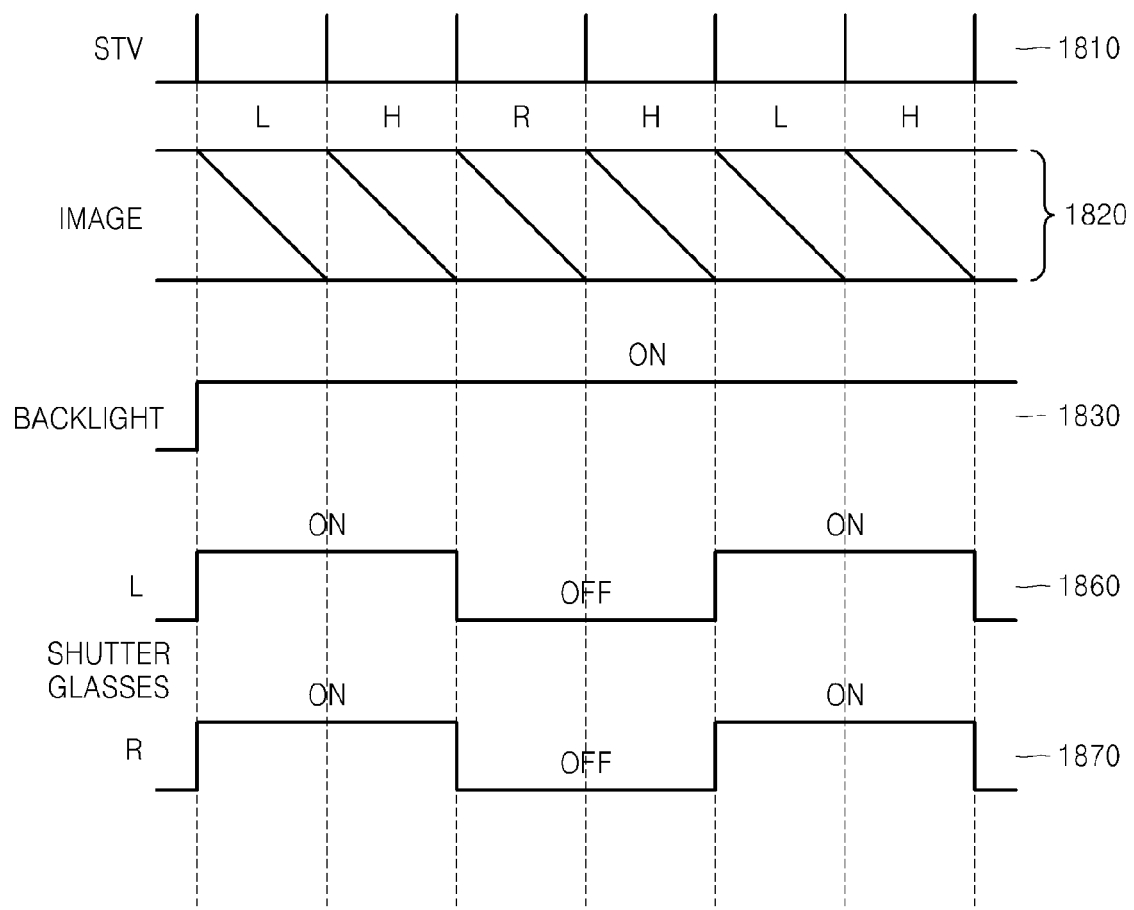
Figure 18C:
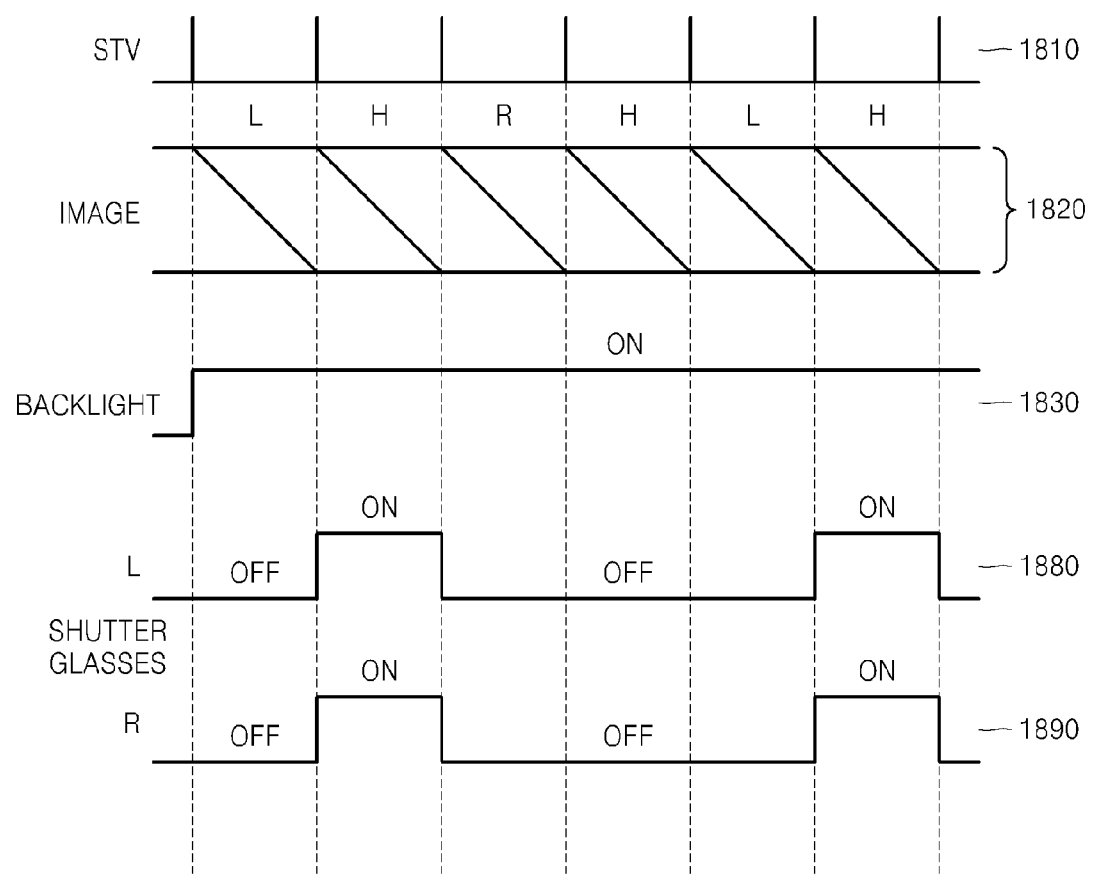

FIGS. 18A through 18C illustrate timing diagrams representing when opening or closing of shutter glasses is controlled to view a 3D image like a 2D image, according to another exemplary embodiment.

Referring to FIGS. 18A through 18C, a timing diagram 1810 of an STV signal used as a synchronization signal, a timing diagram 1820 of a 3D image signal output cycle in synchronization with the timing diagram 1810 of the STV signal, a timing diagram 1830 of a backlight turn-on cycle, and timing diagrams 1840, 1850, 1860, 1870, 1880 and 1890 of opening or closing cycles of left and right shutters of the shutter glasses are illustrated. The timing diagram 1810 of the STV signal and the timing diagram 1830 of the backlight turn-on cycle in FIGS. 18A through 18C are respectively the same as the timing diagram 1510 of the STV signal and the timing diagram 1530 of the backlight turn-on cycle in FIG. 15, and thus detailed descriptions thereof will not be provided here.

In FIGS. 18A through 18C, a pair of corresponding left and right images of a 3D image includes four sequential frames including a single frame each of a left image L, a hold image H, a right image R and a hold image H. That is, four frames, including a left image L, a hold image H, a right image R and a hold image H, are repeatedly output, in sequence, to a display panel. The hold image H is an image for constantly maintaining, for one frame, a data voltage of a previous single frame of a left or right image.

Referring to the timing diagrams 1840 and 1850 of the opening or closing cycles of the left and right shutters of the shutter glasses in FIG. 18A, according to the STV signal, the left and right shutters are open only in periods when the left image L is output and are closed in other periods. With respect to a pair of left and right images, the left and right shutters are open only in a period when the one frame of the left image L is output and are closed in periods when the two frames of hold images HH and the one frame of the right image R are output. Since the left and right shutters are open only in periods when left images are output, a viewer may view only the left images. Accordingly, even when an image source is a 3D image, a viewer may view the 3D image like a 2D image.

Although not shown in FIG. 18A, alternately, the left and right shutters may be open only in periods when the right image R is output and may be closed in other periods (i.e., periods when the two hold images HH and the left image L are output). In this case, a viewer may view only right images and thus may view a 3D image like a 2D image.

Referring to the timing diagrams 1860 and 1870 of the opening or closing cycles of the left and right shutters of the shutter glasses in FIG. 18B, according to the STV signal, the left and right shutters are open only in periods when the left image L and the hold image H following the left image L are output and are closed in other periods. With respect to a pair of left and right images, the left and right shutters are open only in periods when the one frame of the left image L and the one frame of hold image H following the left image L are output and are closed in periods when the one frame of the right image R and the one frame of hold image following the right image R are output. Since the left and right shutters are open only in periods when left images and hold images following the left images are output, a viewer may view only the left images. Accordingly, even when an image source is a 3D image, a viewer may view the 3D image like a 2D image.

Although not shown in FIG. 18B, alternately, the left and right shutters may be open only in periods when the right image R and the hold image H following the right image R are output and may be closed in other periods (i.e., periods when the left image L and the hold image H following the left image L are output). In this case, a viewer may view only right images and thus may view a 3D image like a 2D image.

Referring to the timing diagrams 1880 and 1890 of the opening or closing cycles of the left and right shutters of the shutter glasses in FIG. 18C, according to the STV signal, the left and right shutters are open only in periods when the hold image H following the left image L is output and are closed in other periods. With respect to a pair of left and right images, the left and right shutters are open only in a period when one frame of hold image H following the one frame of left image L is output and are closed in periods when the left image L, the one frame of right image R, and the one frame of hold image H following the right image R are output. Since the left and right shutters are open only in periods when hold images following left images are output, a viewer may view only the left images. Accordingly, even when an image source is a 3D image, a viewer may view the 3D image like a 2D image.

Although not shown in FIG. 18C, alternately, the left and right shutters may be open only in periods when the hold image H following the right image R is output and may be closed in other periods (i.e., periods when the right image R, the left image L, and the hold image H following the left image L are output). In this case, a viewer may view only right images and thus may view a 3D image like a 2D image.

Figure 19:
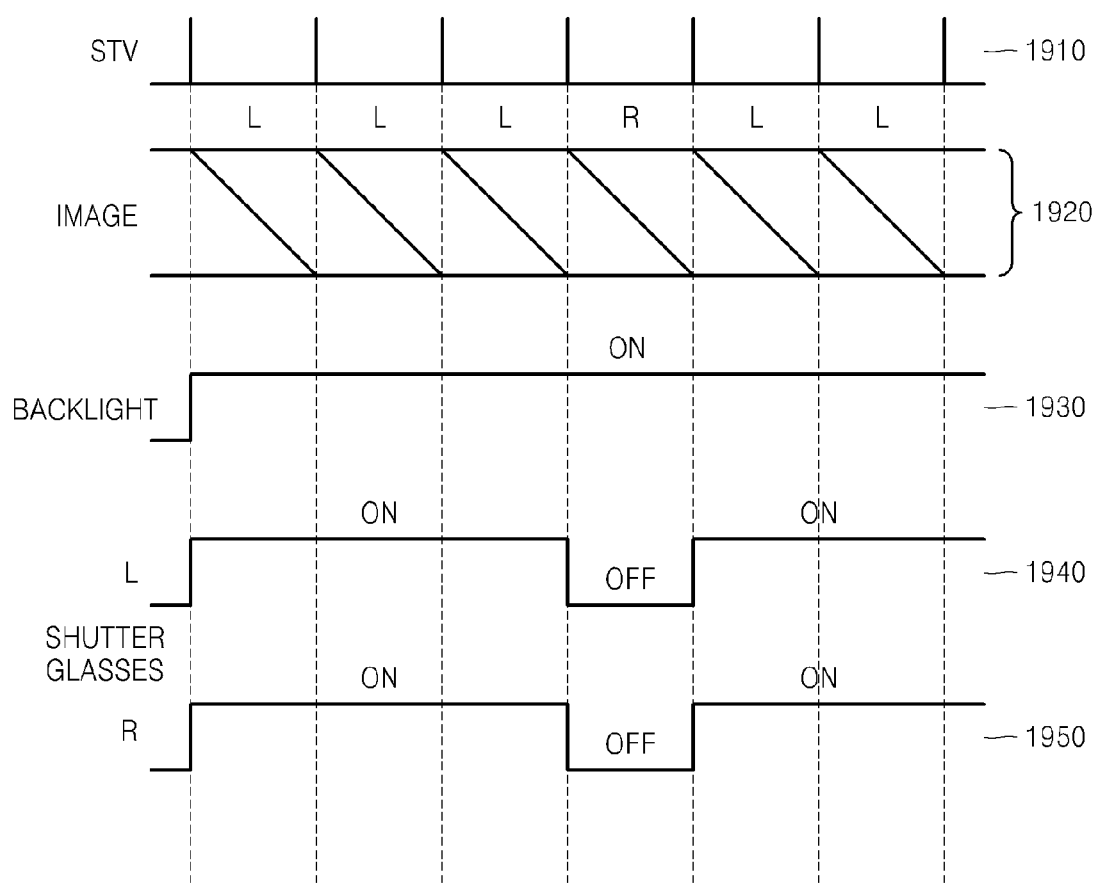

FIG. 19 illustrates timing diagrams representing when opening or closing of shutter glasses is controlled to view a 3D image like a 2D image, according to another exemplary embodiment.

Referring to FIG. 19, a timing diagram 1910 of an STV signal used as a synchronization signal, a timing diagram 1920 of a 3D image signal output cycle in synchronization with the timing diagram 1910 of the STV signal, a timing diagram 1930 of a backlight turn-on cycle, and timing diagrams 1940 and 1950 of opening or closing cycles of left and right shutters of the shutter glasses are illustrated. The timing diagram 1910 of the STV signal and the timing diagram 1930 of the backlight turn-on cycle in FIG. 19 are respectively the same as the timing diagram 1510 of the STV signal and the timing diagram 1530 of the backlight turn-on cycle in FIG. 15, and thus detailed descriptions thereof will not be provided here.

In FIG. 19, a pair of corresponding left and right images of a 3D image comprises four frames, sequentially including a single frame each of a left image L, a left image L, a left image L and a right image R. That is, the four frames including three frames of a left image L and one frame of a right image R, are repeatedly output, in sequence, to a display panel.

Referring to the timing diagrams 1940 and 1950 of the opening or closing cycles of the left and right shutters of the shutter glasses, according to the STV signal, the left and right shutters are open only in periods when the left images LLL are output and are closed in other periods. With respect to a pair of left and right images, the left and right shutters are open only in periods when the three frames of left images LLL are output and are closed in a period when the one frame of right image R is output. Since the left and right shutters are open only in periods when left images are output, a viewer may view only the left images. Accordingly, even when an image source is a 3D image, a viewer may view the 3D image like a 2D image.

Although not shown in FIG. 19, alternately, the left and right shutters may be open only in periods when one or two of the three left images LLL are output and may be closed in other periods. In this case, a viewer may view only left images and thus may view a 3D image like a 2D image. Also, alternately, the left and right shutters may be open only in periods when the right image R is output and may be closed in other periods. In this case, a viewer may view only right images and thus may view a 3D image like a 2D image.

Figure 20:
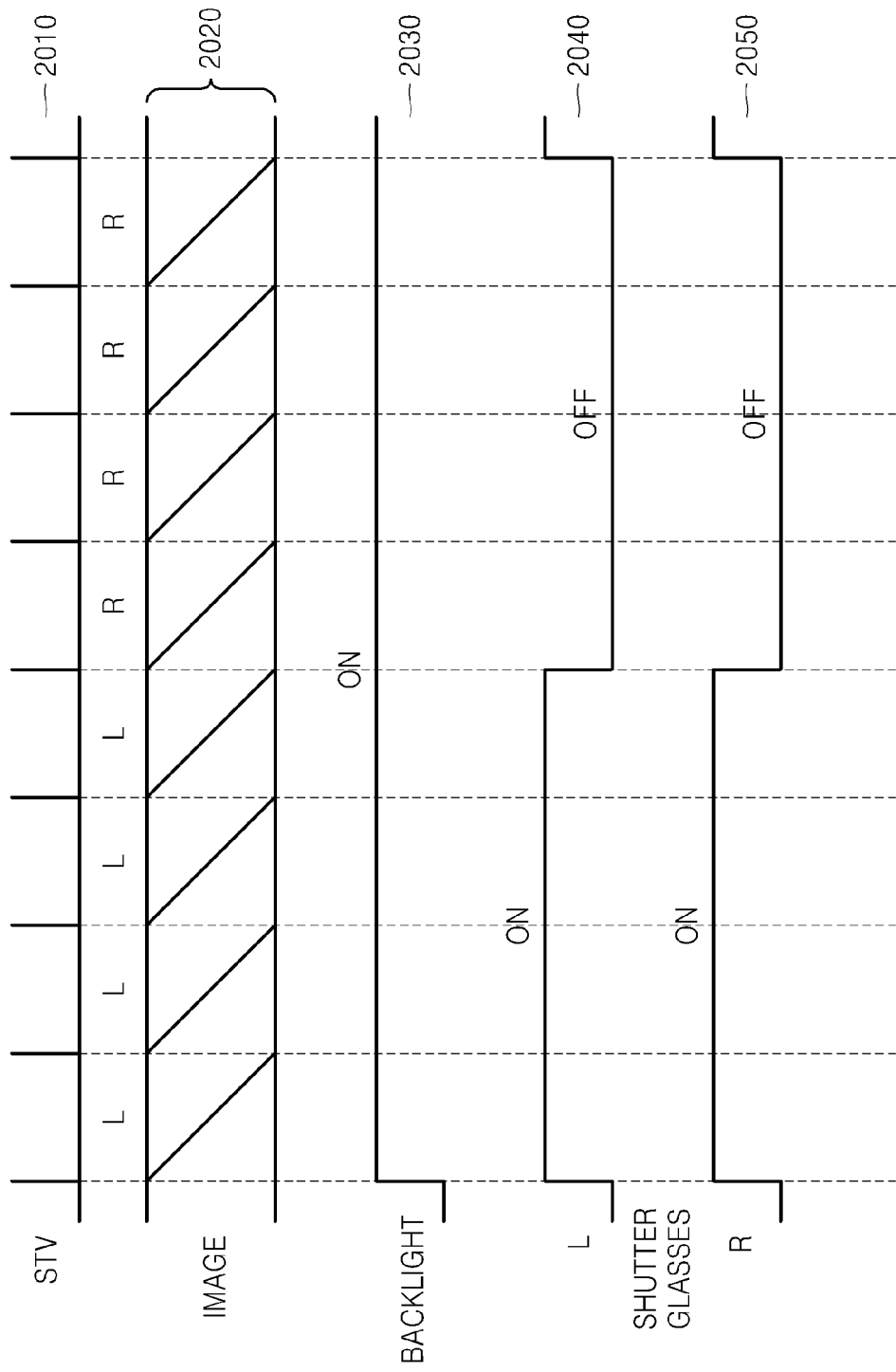

FIG. 20 illustrates timing diagrams representing when opening or closing of shutter glasses is controlled to view a 3D image like a 2D image, according to another exemplary embodiment.

Referring to FIG. 20, a timing diagram 2010 of an STV signal used as a synchronization signal, a timing diagram 2020 of a 3D image signal output cycle in synchronization with the timing diagram 2010 of the STV signal, a timing diagram 2030 of a backlight turn-on cycle, and timing diagrams 2040 and 2050 of opening or closing cycles of left and right shutters of the shutter glasses are illustrated. The timing diagram 2010 of the STV signal and the timing diagram 2030 of the backlight turn-on cycle in FIG. 20 are respectively the same as the timing diagram 1510 of the STV signal and the timing diagram 1530 of the backlight turn-on cycle in FIG. 15, and thus detailed descriptions thereof will not be provided here.

In FIG. 20, a pair of corresponding left and right images of a 3D image includes eight frames sequentially including four continuous frames of left images LLLL and four continuous frames of right images RRRR. That is, eight frames, including a left image L, a left image L, a left image L, a left image L, a right image R, a right image R, a right image R and a right image R, are repeatedly output, in sequence, to a display panel.

Referring to the timing diagrams 2040 and 2050 of the opening or closing cycles of the left and right shutters of the shutter glasses, according to the STV signal, the left and right shutters are open only in periods when the left images LLLL are output and are closed in other periods. With respect to a pair of left and right images, the left and right shutters are open in periods when the four frames of left images LLLL are output and are closed in periods when the four frames of right images RRRR are output. Since the left and right shutters are open only in periods when left images are output, a viewer may view only the left images. Accordingly, even when an image source is a 3D image, a viewer may view the 3D image like a 2D image.

Although not shown in FIG. 20, alternately, the left and right shutters may be open only in periods when one, two or three of the four left images LLLL are output and may be closed in other periods. In this case, a viewer may view only left images and thus may view a 3D image like a 2D image. Also, alternately, the left and right shutters may be open only in periods when the right images RRRR, or one, two or three of the four right images RRRR are output and may be closed in other periods. In this case, a viewer may view only right images and thus may view a 3D image like a 2D image.

Figure 21:
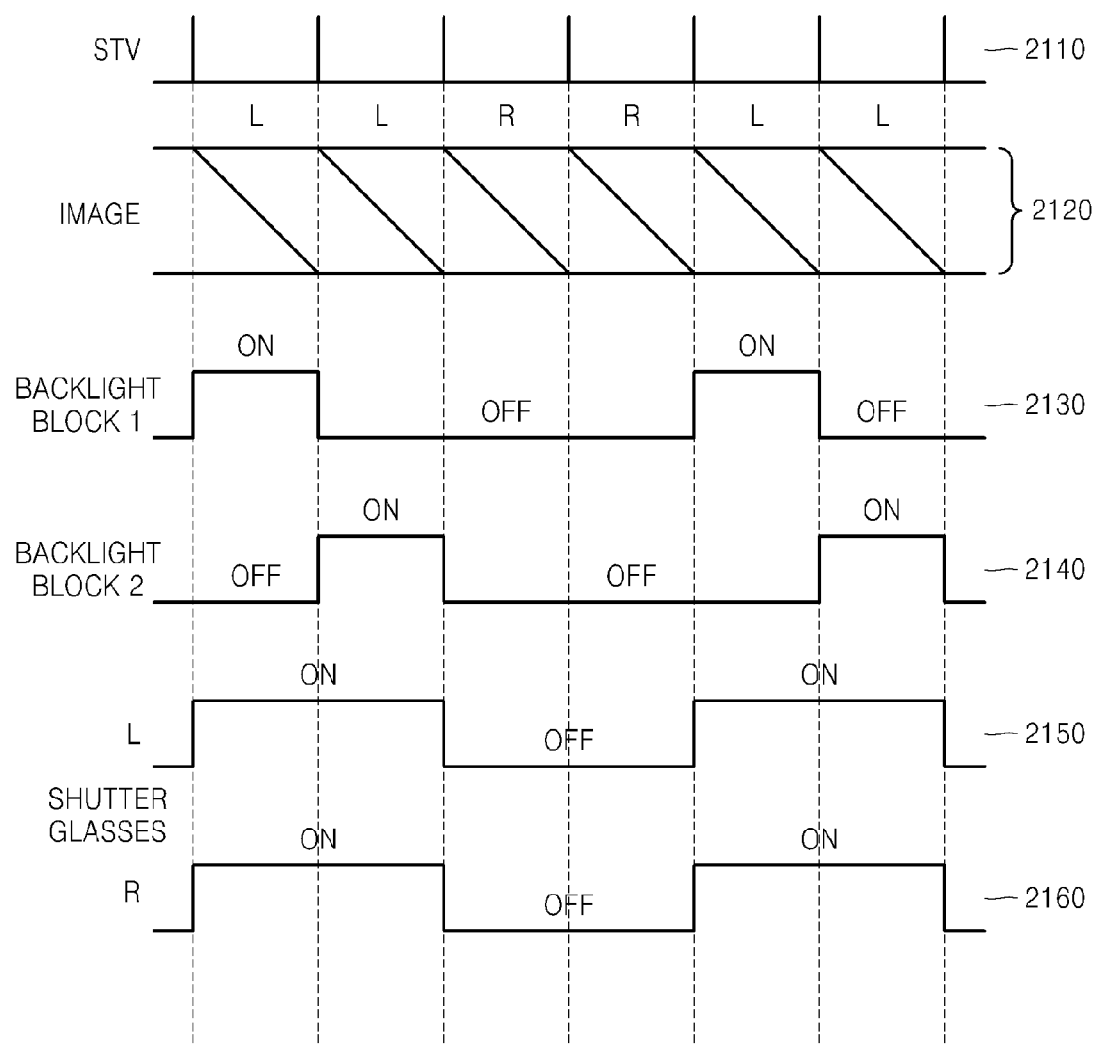

FIG. 21 illustrates timing diagrams representing when opening or closing of shutter glasses is controlled to view a 3D image like a 2D image, according to another exemplary embodiment.

Referring to FIG. 21, a timing diagram 2110 of an STV signal used as a synchronization signal, a timing diagram 2120 of a 3D image signal output cycle in synchronization with the timing diagram 2110 of the STV signal, timing diagrams 2130 and 2140 of a backlight turn-on cycle, and timing diagrams 2150 and 2160 of opening or closing cycles of left and right shutters of the shutter glasses are illustrated. The timing diagram 2110 of the STV signal and the timing diagram 2120 of the 3D image signal output cycle in FIG. 21 are respectively the same as the timing diagram 1510 of the STV signal in FIG. 15 and the timing diagram 920 of the 3D image signal output cycle in FIG. 9, and thus detailed descriptions thereof will not be provided here.

In FIG. 21, the backlight is divided into two blocks, i.e., blocks 1 and 2, and operates by using a scanning method. Two is an exemplary number of blocks and the number of blocks is not limited thereto. Referring to the timing diagram 2130 of the backlight turn-on cycle in the block 1, according to the STV signal, the block 1 of the backlight is turned on only in periods when a first one of two continuous left images LL is output and is turned off in other periods. Referring to the timing diagram 2140 of the backlight turn-on cycle in the block 2, the block 2 of the backlight is turned on after the block 1 of the backlight is turned off. In more detail, the block 2 of the backlight is turned on only in periods when a second one of the two continuous left images LL is output and is turned off in other periods.

Referring to the timing diagrams 2150 and 2160 of the opening or closing cycles of the left and right shutters, the left and right shutters are open only in periods when the blocks 1 and 2 of the backlight are turned on and are closed in periods when the blocks 1 and 2 of the backlight are turned off. In this case, a viewer may view only left images and thus may view a 3D image like a 2D image.

Although not shown in FIG. 21, the block 1 of the backlight may be turned on when one of the two continuous left images LL starts to be output and may be turned off after a predetermined time passes, the block 2 of the backlight may be turned on immediately after the block 1 of the backlight is turned off and may be turned off when one of the two continuous left images LL is completely output, and the left and right shutters may be open in periods when the blocks 1 and 2 of the backlight are turned on. Also, alternately, the blocks 1 and 2 of the backlight may be turned on only in periods when the right images RR are output instead of the left images LL, and the left and right shutters may be open in periods when the blocks 1 and 2 of the backlight are turned on.

Figure 22:
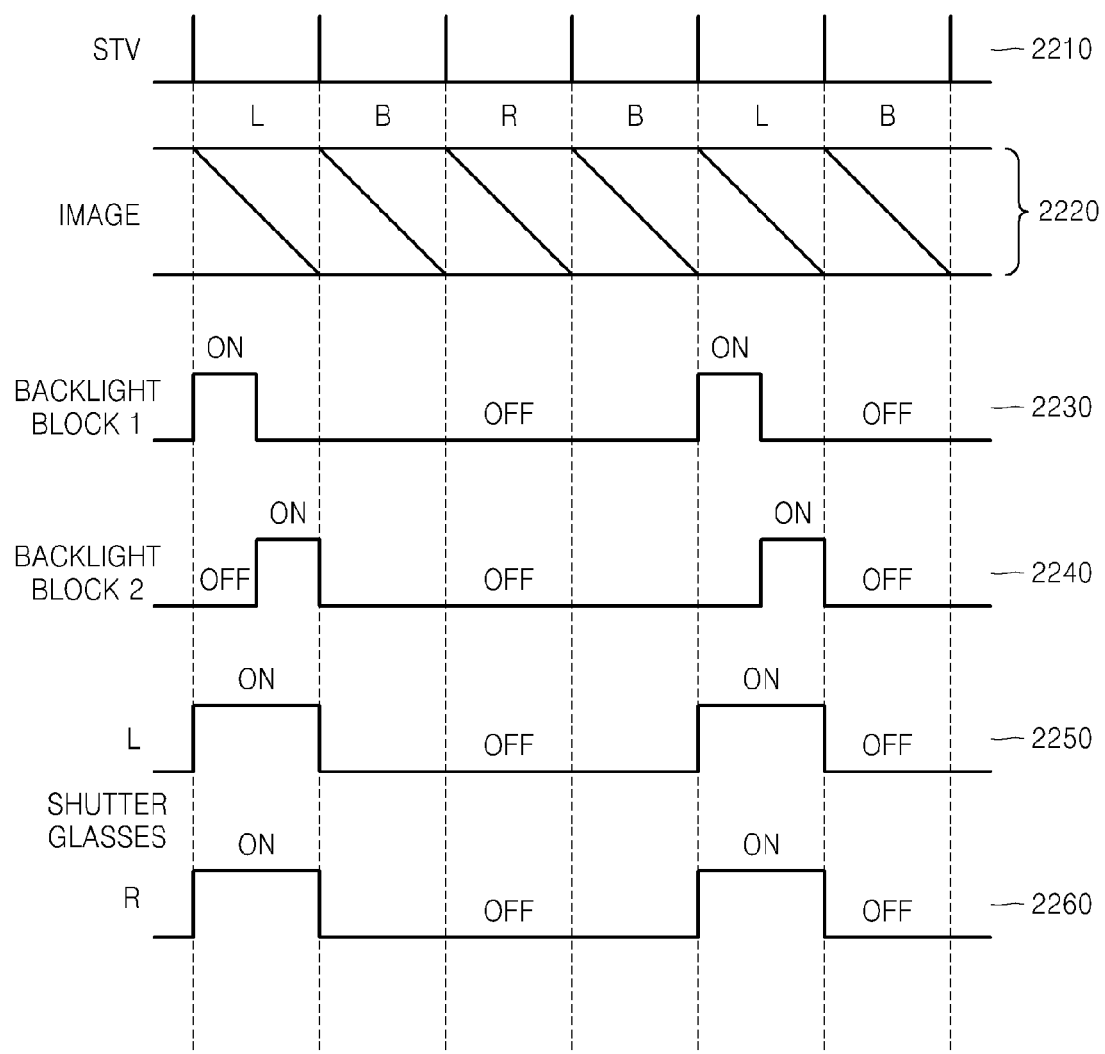

FIG. 22 illustrates timing diagrams representing when opening or closing of shutter glasses is controlled to view a 3D image like a 2D image, according to another exemplary embodiment.

Referring to FIG. 22, a timing diagram 2210 of an STV signal used as a synchronization signal, a timing diagram 2220 of a 3D image signal output cycle in synchronization with the timing diagram 2210 of the STV signal, timing diagrams 2230 and 2240 of a backlight turn-on cycle, and timing diagrams 2250 and 2260 of opening or closing cycles of left and right shutters of the shutter glasses are illustrated. The timing diagram 2210 of the STV signal and the timing diagram 2220 of the 3D image signal output cycle in FIG. 22 are respectively the same as the timing diagram 1510 of the STV signal in FIG. 15 and the timing diagram 1020 of the 3D image signal output cycle in FIG. 10, and thus detailed descriptions thereof will not be provided here.

Referring to the timing diagram 2230 of the backlight turn-on cycle in the block 1, according to the STV signal, the block 1 of the backlight is turned on when a left image L starts to be output and is turned off after a predetermined time passes. Referring to the timing diagram 2240 of the backlight turn-on cycle in the block 2, the block 2 of the backlight is turned on immediately after the block 1 of the backlight is turned off and is turned off when the left image L is completely output.

Referring to the timing diagrams 2250 and 2260 of the opening or closing cycles of the left and right shutters, the left and right shutters are open in periods when the blocks 1 and 2 of the backlight are turned on and are closed in periods when the blocks 1 and 2 of the backlight are turned off. In this case, a viewer may view only left images and thus may view a 3D image like a 2D image.

Although not shown in FIG. 22, alternately, the blocks 1 and 2 of the backlight may be turned on only in periods when the right image R is output instead of the left image L, and the left and right shutters may be open in periods when the blocks 1 and 2 of the backlight are turned on.

Figure 23:
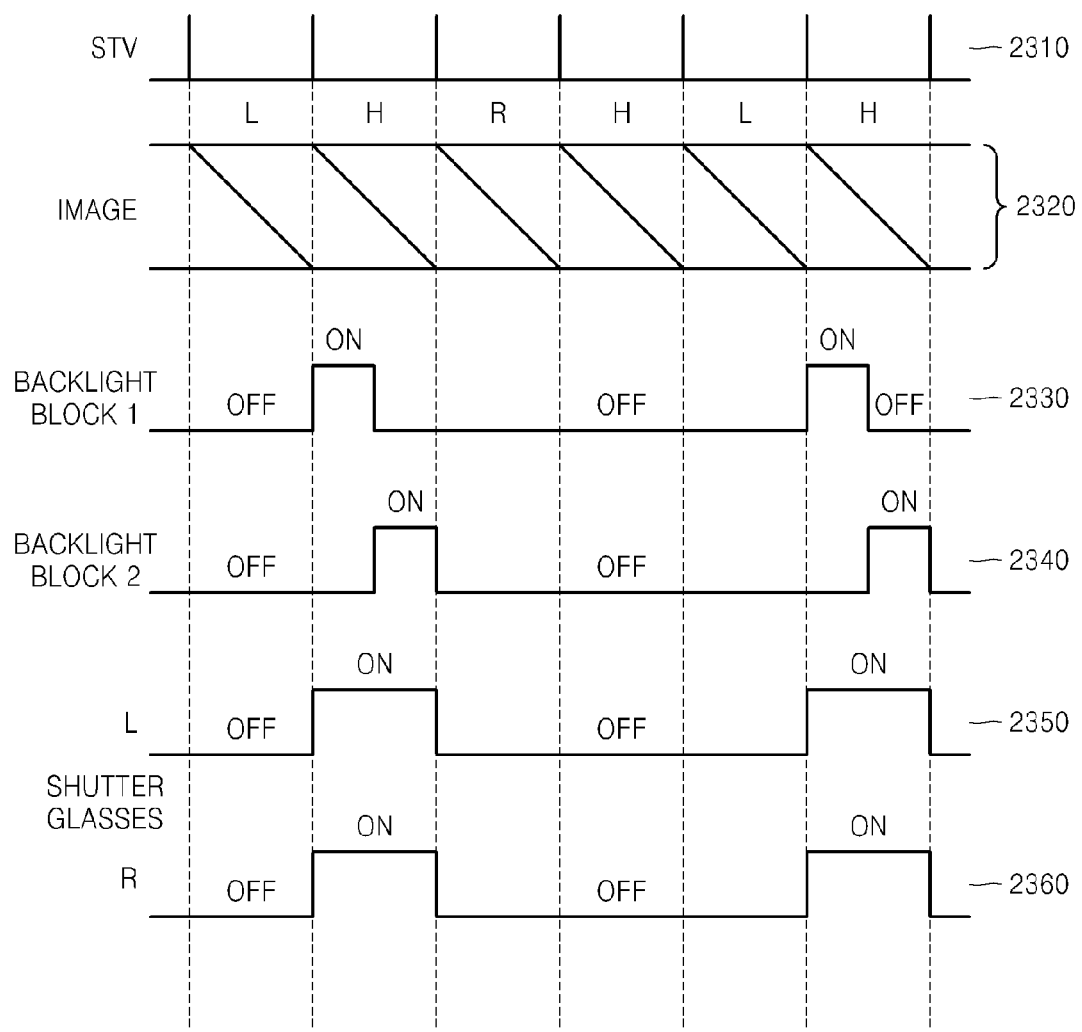

FIG. 23 illustrates timing diagrams representing when opening or closing of shutter glasses is controlled to view a 3D image like a 2D image, according to another exemplary embodiment.

Referring to FIG. 23, a timing diagram 2310 of an STV signal used as a synchronization signal, a timing diagram 2320 of a 3D image signal output cycle in synchronization with the timing diagram 2310 of the STV signal, timing diagrams 2330 and 2340 of a backlight turn-on cycle, and timing diagrams 2350 and 2360 of opening or closing cycles of left and right shutters of the shutter glasses are illustrated. The timing diagram 2310 of the STV signal and the timing diagram 2320 of the 3D image signal output cycle in FIG. 23 are respectively the same as the timing diagram 1510 of the STV signal in FIG. 15 and the timing diagram 1820 of the 3D image signal output cycle in FIGS. 18A through 18C, and thus detailed descriptions thereof will not be provided here.

Referring to the timing diagram 2330 of the backlight turn-on cycle in the block 1, according to the STV signal, the block 1 of the backlight is turned on when a hold image H following a left image L starts to be output and is turned off after a predetermined time passes. Referring to the timing diagram 2340 of the backlight turn-on cycle in the block 2, the block 2 of the backlight is turned on immediately after the block 1 of the backlight is turned off and is turned off when the hold image H following the left image L is completely output.

Referring to the timing diagrams 2350 and 2360 of the opening or closing cycles of the left and right shutters, the left and right shutters are open in periods when the blocks 1 and 2 of the backlight are turned on and are closed in periods when the blocks 1 and 2 of the backlight are turned off. In this case, a viewer may view only left images and thus may view a 3D image like a 2D image.

Although not shown in FIG. 23, alternately, the blocks 1 and 2 of the backlight may be turned on only in periods when the left image L is output or the left image L and the hold image H following the left image L are output, and the left and right shutters may be open in periods when the blocks 1 and 2 of the backlight are turned on. Also, alternately, the blocks 1 and 2 of the backlight may be turned on only in periods when the right image R is output or the right image R and a hold image H following the right image R are output, and the left and right shutters may be open in periods when the blocks 1 and 2 of the backlight are turned on.

Figure 24:
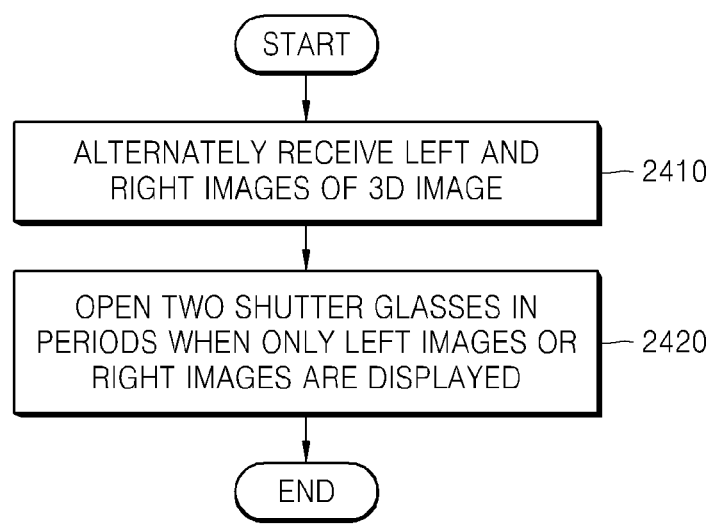
FIG. 24 is a flowchart of a method of controlling opening or closing of shutter glasses to view a 3D image like a 2D image, according to an exemplary embodiment.

FIG. 24 is a flowchart of a method of controlling opening or closing of shutter glasses to view a 3D image like a 2D image, according to an exemplary embodiment. The method illustrated in FIG. 24 allows a viewer to view a 3D image like a 2D image by wearing shutter glasses.

Referring to FIG. 24, in operation 2410, left and right images of a 3D image are alternately received from an external device. According to an exemplary embodiment, a pair of left and right images sequentially includes a left image, an identical left image, a right image and an identical right image. According to an exemplary embodiment, a pair of left and right images sequentially includes a left image, a black image, a right image and a black image. According to an exemplary embodiment, a pair of left and right images sequentially includes a left image, a hold image, a right image and a hold image. In this case, the hold image is an image for constantly maintaining a data voltage of the image of the previous frame image. Accordingly, a hold image following a left image is an image for constantly maintaining a data voltage of the left image. According to an exemplary embodiment, a pair of left and right images sequentially includes a left image, an identical left image, an identical left image and a right image. According to an exemplary embodiment, a pair of left and right images may include eight frames of images. In this case, a pair of left images may include four frames of identical left images and a pair of right images may include four frames of identical right images.

In operation 2420, left and right shutters of the shutter glasses are open in periods when only left images or only right images are displayed. In this case, a viewer may view only left images or only right images and thus may view a 3D image like a 2D image.

According to an exemplary embodiment, if a pair of left and right images sequentially includes a left image, an identical left image, a right image and an identical right image, a backlight may be turned on in all periods when the images are output and the left and right shutters may be open in periods when only the left images or only the right images are output. For example, the left and right shutters may be open only in periods when one or two of the two frames of left images are output. The same method may also be applied to the right images.

According to an exemplary embodiment, if a pair of left and right images sequentially includes a left image, a black image, a right image and a black image, the backlight may be turned on in all periods when the images are output, and the left and right shutters may be open in periods when only the left image or only the right image is output and may be closed in other periods.

According to an exemplary embodiment, if a pair of left and right images sequentially includes a left image, a hold image, a right image and a hold image, the backlight may be turned on in all periods when the images are output, and the left and right shutters may be open only in periods when the left image is output, only in periods when the hold image following the left image is output, or only in periods when the left image and the hold image following the left image are output, and may be closed in other periods. The same method may also be applied to the right image and the hold image continuous from the right image.

According to an exemplary embodiment, if a pair of left and right images sequentially includes a left image, an identical left image, an identical left image and a right image, the backlight may be turned on in all periods when the images are output, and the left and right shutters may be open only in periods when at least one of the left images is output and may be closed in other periods. The same method may also be applied to the right image.

According to an exemplary embodiment, if a pair of left and right images sequentially includes four frames of identical left images and four frames of identical right images, the backlight may be turned on in all periods when the images are output, and the left and right shutters may be open only in periods when at least one of the left images is output and may be closed in other periods. The same method may also be applied to the right images. In the above descriptions, the backlight may also be turned on or off by using a scanning method.

Exemplary embodiments can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing exemplary embodiments can be easily construed by programmers of ordinary skill in the art.

While exemplary embodiments have been particularly shown and described, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the invention but by the following claims, and all differences within the scope will be construed as being included in the present inventive concept.

What is claimed is:

1. An image display method comprising:
   alternately receiving left and right images of a three-dimensional (3D) image; and
   turning on and off a backlight such that
   an entire backlight is on only in periods when the left images are displayed and is off in periods when the right images are displayed, or the entire backlight is on only in periods when the right images are displayed and is off in periods when the left images are displayed.

2. The method of claim 1, wherein a pair of corresponding left and right images of the 3D image comprises, sequentially, two left images and two right images.

3. The method of claim 2, wherein the turning on and off of the backlight comprises turning on and off the backlight such that:
   the backlight is on only in periods when one of the two left images is displayed, and is off when the other one of the two left images is displayed, or the backlight is on only in periods when one of the two right images is displayed and is off when the other one of the two right images is displayed.

4. The method of claim 1, wherein a pair of corresponding left and right images of the 3D image sequentially comprises a left image, a black image, a right image and a black image.

5. The method of claim 1, wherein a pair of corresponding left and right images of the 3D image sequentially comprises a left image, a hold image of the left image, a right image and a hold image of the right image, and wherein the hold image is an image which constantly maintains a data voltage of a previous left or right image.

6. The method of claim 5, wherein the turning on of the backlight comprises turning on and off the backlight such that:
   the backlight is on only in periods when the left image is displayed, the left image and the hold image of the left image is displayed, or the hold image of the left image is displayed; or
   the backlight is on only in periods when the right image is displayed, the right image and the hold image of the right image is displayed, or the hold image of the right image is displayed.

7. The method of claim 1, wherein a pair of corresponding left and right images of the 3D image comprises, sequentially, three left images and a right image.

8. The method of claim 1, wherein a pair of corresponding left and right images of the 3D image comprises, sequentially, four left images and four right images.

9. The method of claim 1, wherein the turning on and off of the backlight comprises turning on the backlight in synchronization with a vertical synchronization signal.

10. The method of claim 1, wherein the turning on and off of the backlight comprises turning on the backlight in synchronization with a start vertical signal or a clock pulse vertical signal.

11. The method of claim 1, wherein the turning on and off of the backlight comprises turning on the backlight by advancing or delaying periods when the backlight is turned on, according to an amount of crosstalk.

12. The method of claim 1, wherein the turning on of the backlight comprises turning on the backlight by using a scanning method.

13. An image display apparatus comprising:
   a display panel;
   a display panel control unit for outputting left and right images of a 3D image to the display panel; and
   a backlight control unit for turning a backlight on and off such that:
   an entire backlight is on only in periods when the left images are displayed and is off in periods when the right images are displayed, or
   the entire backlight is on only in periods when the right images are displayed and is off in periods when the left images are displayed.

14. A non-transitory computer readable recording medium having recorded thereon a computer program for executing the method of claim 1.

* * * * *